(12) United States Patent
Wong et al.

(10) Patent No.: US 8,108,430 B2
(45) Date of Patent: *Jan. 31, 2012

(54) CAROUSEL CONTROL FOR METADATA NAVIGATION AND ASSIGNMENT

(75) Inventors: Lyon King-Fook Wong, Issaquah, WA (US); Stephan Hoefnagels, Seattle, WA (US); Relja B. Ivanovic, Seattle, WA (US); David G. De Vorchik, Seattle, WA (US); Paul L. Cutsinger, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 893 days.

This patent is subject to a terminal disclaimer.

(21) Appl. No.: 11/192,101

(22) Filed: Jul. 29, 2005

(65) Prior Publication Data

US 2006/0004873 A1      Jan. 5, 2006

Related U.S. Application Data

(63) Continuation-in-part of application No. 10/837,487, filed on Apr. 30, 2004, now Pat. No. 7,496,583.

(51) Int. Cl.
*G06F 17/30* (2006.01)
(52) U.S. Cl. .......................... 707/792; 707/803
(58) Field of Classification Search .................. 707/803, 707/792
See application file for complete search history.

(56) References Cited

U.S. PATENT DOCUMENTS

| | | | |
|---|---|---|---|
| 5,206,949 A * | 4/1993 | Cochran et al. .................. 707/4 |
| 5,241,671 A | 8/1993 | Reed et al. | |
| 5,333,315 A | 7/1994 | Saether et al. | |
| 5,388,196 A | 2/1995 | Pajak et al. | |
| 5,461,710 A | 10/1995 | Bloomfield et al. | |
| 5,499,364 A | 3/1996 | Klein et al. | |
| 5,504,852 A | 4/1996 | Thompson-Rohrlich | |
| 5,513,306 A | 4/1996 | Mills et al. | |
| 5,559,948 A | 9/1996 | Bloomfield et al. | |
| 5,598,524 A | 1/1997 | Johnston, Jr. et al. | |
| 5,630,042 A | 5/1997 | McIntosh et al. | |

(Continued)

FOREIGN PATENT DOCUMENTS

CN        1421800        11/2001

(Continued)

OTHER PUBLICATIONS

Adobe, Inc., et al., "Adobe Photoshop CS Classroom in a Book," Dec. 1, 2003, pp. 1-29.

(Continued)

*Primary Examiner* — Son T Hoang

(74) *Attorney, Agent, or Firm* — Shook Hardy & Bacon LLP

(57) ABSTRACT

A property tree user interface permits user assignment of values to metadata properties and user navigation of data, within a system that includes a data storage subsystem in which data items are organized and queried by way of properties. The property tree includes nodes that expose properties of data items. A user may interact with the property tree in order to effect an assignment of a property, in which case the value associated with the property in the data storage subsystem is modified. The property tree may also display nodes that represent folders within a hierarchical file system, nodes that represent properties with inherent hierarchy, and nodes that represent user-defined hierarchical properties, and the property tree may display such nodes in a carousel control.

19 Claims, 21 Drawing Sheets

U.S. PATENT DOCUMENTS

| | | | |
|---|---|---|---|
| 5,680,563 A | 10/1997 | Edelman | |
| 5,696,486 A | 12/1997 | Poliquin et al. | |
| 5,757,925 A | 5/1998 | Faybishenko | |
| 5,790,121 A | 8/1998 | Sklar et al. | |
| 5,802,516 A | 9/1998 | Shwarts et al. | |
| 5,831,606 A | 11/1998 | Nakajima et al. | |
| 5,835,094 A | 11/1998 | Ermel et al. | |
| 5,838,317 A | 11/1998 | Bolnick et al. | |
| 5,838,322 A | 11/1998 | Nakajima et al. | |
| 5,867,163 A | 2/1999 | Kurtenbach | |
| 5,875,446 A | 2/1999 | Brown et al. | |
| 5,878,410 A | 3/1999 | Zbikowski et al. | |
| 5,899,995 A | 5/1999 | Millier et al. | |
| 5,917,492 A * | 6/1999 | Bereiter et al. | 715/854 |
| 5,923,328 A | 7/1999 | Griesmer | |
| 5,929,854 A | 7/1999 | Ross | |
| 5,933,139 A | 8/1999 | Feigner et al. | |
| 5,935,210 A | 8/1999 | Stark | |
| 5,987,454 A | 11/1999 | Hobbs | |
| 5,987,506 A | 11/1999 | Carter et al. | |
| 5,999,948 A * | 12/1999 | Nelson et al. | 715/207 |
| 6,003,040 A | 12/1999 | Mital et al. | |
| 6,008,806 A | 12/1999 | Nakajima et al. | |
| 6,014,137 A | 1/2000 | Burns | |
| 6,021,262 A | 2/2000 | Cote et al. | |
| 6,023,708 A | 2/2000 | Mendez et al. | |
| 6,025,843 A | 2/2000 | Sklar | |
| 6,037,944 A | 3/2000 | Hugh | |
| 6,061,692 A | 5/2000 | Thomas et al. | |
| 6,061,695 A | 5/2000 | Slivka et al. | |
| 6,078,924 A | 6/2000 | Ainsbury et al. | |
| 6,097,389 A | 8/2000 | Morris et al. | |
| 6,144,968 A | 11/2000 | Zellweger | |
| 6,147,601 A | 11/2000 | Sandelman et al. | |
| 6,181,342 B1 | 1/2001 | Niblack | |
| 6,202,061 B1 | 3/2001 | Khosla et al. | |
| 6,237,011 B1 | 5/2001 | Ferguson et al. | |
| 6,240,421 B1 | 5/2001 | Stolarz | |
| 6,243,094 B1 | 6/2001 | Sklar | |
| 6,243,724 B1 | 6/2001 | Mander et al. | |
| 6,246,411 B1 | 6/2001 | Strauss | |
| 6,256,031 B1 | 7/2001 | Meijer et al. | |
| 6,275,829 B1 | 8/2001 | Angiulo et al. | |
| 6,308,173 B1 | 10/2001 | Glasser et al. | |
| 6,314,367 B1 * | 11/2001 | Ohler et al. | 701/208 |
| 6,317,142 B1 * | 11/2001 | Decoste et al. | 715/762 |
| 6,321,334 B1 * | 11/2001 | Jerger et al. | 726/1 |
| 6,324,551 B1 | 11/2001 | Lamping et al. | |
| 6,339,767 B1 | 1/2002 | Rivette et al. | |
| 6,341,280 B1 | 1/2002 | Glass et al. | |
| 6,363,377 B1 | 3/2002 | Kravets et al. | |
| 6,363,400 B1 | 3/2002 | Chtchetkine et al. | |
| 6,396,842 B1 * | 5/2002 | Rochberger | 370/408 |
| 6,401,097 B1 | 6/2002 | McCotter et al. | |
| 6,411,311 B1 | 6/2002 | Rich et al. | |
| 6,430,575 B1 | 8/2002 | Dourish et al. | |
| 6,437,807 B1 | 8/2002 | Berquist et al. | |
| 6,448,985 B1 | 9/2002 | McNally | |
| 6,453,311 B1 | 9/2002 | Powers, III | |
| 6,453,319 B1 | 9/2002 | Mattis et al. | |
| 6,466,238 B1 | 10/2002 | Berry et al. | |
| 6,466,932 B1 | 10/2002 | Dennis et al. | |
| 6,480,835 B1 | 11/2002 | Light | |
| 6,505,233 B1 | 1/2003 | Hanson et al. | |
| 6,513,038 B1 | 1/2003 | Hasegawa et al. | |
| 6,526,399 B1 | 2/2003 | Coulson et al. | |
| 6,535,229 B1 | 3/2003 | Kraft | |
| 6,535,230 B1 | 3/2003 | Celik | |
| 6,539,399 B1 | 3/2003 | Hazama et al. | |
| 6,549,217 B1 | 4/2003 | De Greef et al. | |
| 6,549,916 B1 | 4/2003 | Sedlar | |
| 6,563,514 B1 | 5/2003 | Samar | |
| 6,573,906 B1 | 6/2003 | Harding et al. | |
| 6,573,907 B1 | 6/2003 | Madrane | |
| 6,583,799 B1 | 6/2003 | Manolis et al. | |
| 6,590,585 B1 | 7/2003 | Suzuki et al. | |
| 6,606,105 B1 | 8/2003 | Quartetti | |
| 6,613,101 B2 | 9/2003 | Mander et al. | |
| 6,628,309 B1 | 9/2003 | Dodson et al. | |
| 6,636,238 B1 | 10/2003 | Amir et al. | |
| 6,636,250 B1 | 10/2003 | Gasser | |
| 6,642,946 B1 * | 11/2003 | Janes et al. | 715/854 |
| 6,662,198 B2 | 12/2003 | Satyanarayanan et al. | |
| 6,684,222 B1 | 1/2004 | Cornelius et al. | |
| 7,043,415 B1 * | 5/2006 | Dunlavey et al. | 703/12 |
| 7,392,255 B1 * | 6/2008 | Sholtis et al. | 707/203 |
| 2001/0018858 A1 * | 9/2001 | Dwek | 84/609 |
| 2001/0034771 A1 | 10/2001 | Hutsch et al. | |
| 2001/0047368 A1 | 11/2001 | Oshinsky et al. | |
| 2001/0049675 A1 | 12/2001 | Mandler et al. | |
| 2001/0053996 A1 | 12/2001 | Atkinson | |
| 2001/0056434 A1 | 12/2001 | Kaplan et al. | |
| 2001/0056508 A1 | 12/2001 | Arneson et al. | |
| 2002/0019935 A1 | 2/2002 | Andrew et al. | |
| 2002/0033844 A1 | 3/2002 | Levy et al. | |
| 2002/0046232 A1 | 4/2002 | Adams et al. | |
| 2002/0046299 A1 | 4/2002 | Lefeber et al. | |
| 2002/0049717 A1 | 4/2002 | Routtenberg et al. | |
| 2002/0052885 A1 | 5/2002 | Levy | |
| 2002/0054167 A1 | 5/2002 | Hugh | |
| 2002/0059199 A1 | 5/2002 | Harvey | |
| 2002/0062310 A1 | 5/2002 | Marmor et al. | |
| 2002/0075310 A1 | 6/2002 | Prabhu et al. | |
| 2002/0075312 A1 | 6/2002 | Amadio et al. | |
| 2002/0075330 A1 | 6/2002 | Rosenzweig et al. | |
| 2002/0087740 A1 | 7/2002 | Castanho et al. | |
| 2002/0087969 A1 | 7/2002 | Brunheroto et al. | |
| 2002/0089540 A1 | 7/2002 | Geier et al. | |
| 2002/0091679 A1 | 7/2002 | Wright | |
| 2002/0091697 A1 | 7/2002 | Huang et al. | |
| 2002/0091739 A1 | 7/2002 | Ferlitsch et al. | |
| 2002/0095416 A1 | 7/2002 | Schwols | |
| 2002/0097278 A1 | 7/2002 | Mandler et al. | |
| 2002/0103998 A1 | 8/2002 | DeBruine | |
| 2002/0104069 A1 | 8/2002 | Gouge et al. | |
| 2002/0107973 A1 | 8/2002 | Lennon et al. | |
| 2002/0111942 A1 | 8/2002 | Campbell et al. | |
| 2002/0113821 A1 | 8/2002 | Hrebejk et al. | |
| 2002/0120505 A1 | 8/2002 | Henkin et al. | |
| 2002/0120757 A1 | 8/2002 | Sutherland et al. | |
| 2002/0129033 A1 | 9/2002 | Hoxie et al. | |
| 2002/0138552 A1 | 9/2002 | DeBruine et al. | |
| 2002/0138582 A1 | 9/2002 | Chandra et al. | |
| 2002/0138744 A1 | 9/2002 | Schleicher et al. | |
| 2002/0152262 A1 | 10/2002 | Arkin et al. | |
| 2002/0152267 A1 | 10/2002 | Lennon | |
| 2002/0156895 A1 | 10/2002 | Brown | |
| 2002/0161800 A1 | 10/2002 | Eld et al. | |
| 2002/0163572 A1 | 11/2002 | Center et al. | |
| 2002/0169678 A1 | 11/2002 | Chao et al. | |
| 2002/0184357 A1 | 12/2002 | Traversat et al. | |
| 2002/0188605 A1 | 12/2002 | Adya et al. | |
| 2002/0188735 A1 | 12/2002 | Needham et al. | |
| 2002/0194252 A1 | 12/2002 | Powers, III | |
| 2002/0196276 A1 | 12/2002 | Corl et al. | |
| 2002/0199061 A1 | 12/2002 | Friedman et al. | |
| 2003/0009484 A1 | 1/2003 | Hamanaka et al. | |
| 2003/0014415 A1 | 1/2003 | Weiss et al. | |
| 2003/0018657 A1 | 1/2003 | Monday | |
| 2003/0018712 A1 | 1/2003 | Harrow et al. | |
| 2003/0028610 A1 | 2/2003 | Pearson | |
| 2003/0041178 A1 | 2/2003 | Brouk et al. | |
| 2003/0046260 A1 | 3/2003 | Satyanarayanan et al. | |
| 2003/0046700 A1 * | 3/2003 | Wilcox et al. | 725/60 |
| 2003/0069893 A1 | 4/2003 | Kanai et al. | |
| 2003/0069908 A1 | 4/2003 | Anthony et al. | |
| 2003/0074356 A1 | 4/2003 | Kaier et al. | |
| 2003/0078918 A1 | 4/2003 | Souvignier et al. | |
| 2003/0088854 A1 * | 5/2003 | Wygodny et al. | 717/130 |
| 2003/0093321 A1 | 5/2003 | Bodmer et al. | |
| 2003/0093531 A1 | 5/2003 | Yeung et al. | |
| 2003/0093580 A1 | 5/2003 | Thomas et al. | |
| 2003/0101200 A1 | 5/2003 | Koyama et al. | |
| 2003/0105745 A1 | 6/2003 | Davidson et al. | |
| 2003/0110188 A1 | 6/2003 | Howard et al. | |
| 2003/0115218 A1 | 6/2003 | Bobbitt et al. | |
| 2003/0117403 A1 | 6/2003 | Park et al. | |

| | | | |
|---|---|---|---|
| 2003/0117422 | A1 | 6/2003 | Hiyama et al. |
| 2003/0120928 | A1 | 6/2003 | Cato et al. |
| 2003/0120952 | A1 | 6/2003 | Tarbotton et al. |
| 2003/0122873 | A1 | 7/2003 | Dieberger et al. |
| 2003/0126136 | A1 | 7/2003 | Omoigui |
| 2003/0126212 | A1 | 7/2003 | Morris et al. |
| 2003/0135495 | A1 | 7/2003 | Vagnozzi |
| 2003/0135517 | A1 | 7/2003 | Kauffman |
| 2003/0135659 | A1 | 7/2003 | Bellotti et al. |
| 2003/0140115 | A1 | 7/2003 | Mehra |
| 2003/0154185 | A1 | 8/2003 | Suzuki et al. |
| 2003/0158855 | A1 | 8/2003 | Farnham et al. |
| 2003/0163486 | A1 | 8/2003 | Van Der Meulen |
| 2003/0177422 | A1 | 9/2003 | Tararoukhine et al. |
| 2003/0184587 | A1 | 10/2003 | Ording et al. |
| 2003/0210281 | A1 | 11/2003 | Ellis et al. |
| 2003/0212680 | A1 | 11/2003 | Bates et al. |
| 2003/0212710 | A1 | 11/2003 | Guy |
| 2003/0222915 | A1 | 12/2003 | Marion et al. |
| 2003/0225796 | A1 | 12/2003 | Matsubara |
| 2003/0227487 | A1 | 12/2003 | Hugh |
| 2003/0233419 | A1 | 12/2003 | Beringer |
| 2004/0001106 | A1 | 1/2004 | Deutscher et al. |
| 2004/0002993 | A1 | 1/2004 | Toussaint et al. |
| 2004/0003247 | A1 | 1/2004 | Fraser et al. |
| 2004/0008226 | A1 | 1/2004 | Manolis et al. |
| 2004/0019584 | A1 | 1/2004 | Greening et al. |
| 2004/0019655 | A1 | 1/2004 | Uemura et al. |
| 2004/0030731 | A1 | 2/2004 | Iftode et al. |
| 2004/0044696 | A1 | 3/2004 | Frost |
| 2004/0044776 | A1 | 3/2004 | Larkin |
| 2004/0054674 | A1 | 3/2004 | Carpenter et al. |
| 2004/0056896 | A1 | 3/2004 | Doblmayr et al. |
| 2004/0068524 | A1 | 4/2004 | Aboulhosn et al. |
| 2004/0070612 | A1 | 4/2004 | Sinclair et al. |
| 2004/0083433 | A1 | 4/2004 | Takeya |
| 2004/0111431 | A1 | 6/2004 | Zeller et al. |
| 2005/0018858 | A1 | 1/2005 | John |
| 2005/0044509 | A1* | 2/2005 | Hunleth et al. ............... 715/834 |
| 2005/0046700 | A1 | 3/2005 | Bracke |
| 2005/0086534 | A1* | 4/2005 | Hindawi et al. ............... 713/201 |

FOREIGN PATENT DOCUMENTS

| | | | |
|---|---|---|---|
| GB | 2329492 | | 3/1999 |
| JP | WO03062976 | * | 7/2003 |
| WO | 9938092 | | 7/1999 |
| WO | 01/63919 A1 | | 8/2001 |
| WO | WO 0225420 | | 3/2002 |

OTHER PUBLICATIONS

Adobe, Inc., et al., "Adobe Photoshop 7.0", 2001; pp. 1-9.
Heinlein, et al., "Integration of Message Passing and Shared Memory in the Stanford Flash Multiprocessor, Architectural Support for Programming Languages and Operating Systems," pp. 38-50, published 1994.
Microsoft Windows XP Version 2002 (Screen Dumps, Figs. 1-16).
Simpson, Alan, Windows 95 Uncut, 1995, IDG Books Worldwide, Inc., pp. 104-107.
Feng, et al., "Schemata Transformation of Object-Oriented Conceptual Models to XML", Computer systems Science & Engineering, vol. 18, No. 1, Jan. 2003.
Joseph, M., "The UML for Data Modellers," Elektron, Apr. 2004, pp. 72-73.
Wang, G., et al., "Extending XML Schema with Nonmonotonic Inheritance," in M.A. Jesufeld and O. Paster (eds.), ER 2003 Workshops, Lecture Notes in Computer Science 2814:402-407.2003.
Microsoft Press Pass, "Windows XP is Here!", New York, Oct. 25, 2001.
McFedries, Paul, "The Complete Idiot's Guide to Windows XP", Table of Contents, Oct. 3, 2001; Alpha Books, Chapter 8: A Tour of the My Pictures Folder—printed pp. 1-8, Chapter 11: Sights and Sounds: Music and Other Multimedia-printed pp. 1-3.
Stanek R. William, "Microsoft Windows XP Professional Administrator's Pocket Consultant", Sep. 25, 2001; Microsoft Press, Chapter 9, printed pp. 1-8.
Shah, Sarju, "Windows XP Preview", FiringSquad, May 4, 2001, online, printed pp. 1-5; Figure: Hi-Res Image Viewer.
A.T. McCray, et al., Extending the Role of Metadata in a Digital Library System, May 19, 1999, IEEE, pp. 190-199.
Alexa T. McCray, et al., Principles for Digital Library Development, May 2001, ACM, pp. 49-53.
Stelovsky, J., and C. Aschwanden, "Software Architecture for Unified Management of Event Notification and Stream I/O and Its Use for Recording and Analysis of User Events," *Proceedings of the 35th Annual Hawaii International Conference on System Sciences*, IEEE Computer Society, Big Island, Hawaii, Jan. 7-10, 2002, p. 1862-1867.
"About Managing Messages With Rules", Microsoft® Outlook® 2003 Help file, 3 pp.
"Trillian/Trillian Pro IM Clients" Products Description, ©1999-2004 Cerulean Studios, <http://www.ceruleanstudios.com> [retrieved Apr. 30, 2004].
Lee, J., "An End-User Perspective on File-Sharing Systems," Communications of the ACM 46(2):49-53, Feb. 2003.
Ohtani, A., et al., "A File Sharing Method for Storing Area Network and Its Performance Verification," NEC Res. & Develop. 44(1):85-90, Jan. 2003.
H. Weinreich, et al., "The Look of the Link—Concepts of the User Interface of Extended Hyperlinks," Proceedings of the Twelfth ACM Conference on Hypertext and Hypermedia, Hypertext '01, Aarhus, Denmark, Aug. 2001, pp. 19-28.
Seltzer, M., et al., "Journaling Versus Soft Updates: Asynchronous Meta-data Protection in File Systems," Proceedings of the 2000 USENIX Technical Conference, San Diego, CA, Jun. 18-23, 2000, pp. 71-84.
R. Rao, et al., "Rich Interaction in the Digital Library," Communications of the ACM 38(4):29-39.1995.
Piernas, J., et al., "DualFS: A New Journaling File System Without Meta-Data Duplication," Conference Proceedings of the 2002 International Conference on Supercomputing, New York, Jun. 22-26, 2002, p. 137-146.
Manber, U., and S. Wu, "GLIMPSE: A Tool to Search Through Entire File Systems," Proceedings of USENIX Winter 1994 Conference, San Francisco, CA, Jan. 17-21, 1994.
Coster, R., and D. Svensson, "Inverted File Search Algorithms for Collaborative Filtering," Proceedings of the 25th Annual International ACM SIGIR Conference on Research and Development in Information Retrieval, Tampere, Finland, Aug. 11-15, 2002.
Gifford, D.K., et al., "Semantic File Systems," Proceedings of the 13th ACM Symposium on Operating Systems Principles, Pacific Grove CA., Sep. 1991, pp. 16-25.
Blair, C., and G.E. Monahan, "Optimal Sequential File Search: A Reduced-State Dynamic Programming Approach," European Journal of Operational Research 86(2):358-365, 1995.
Clay, L.M., et al., Posting Protocol for Improved Keyword Search Success in Peer-to-Peer File Sharing Systems, Proceedings of SPIE-Int. Soc. Opt. Eng., Santa Clara, CA, Jan. 23-24, 2003, vol. 5019, pp. 138-149.
Na, J., and V. Rajaravivarma, "Multimedia File Sharing in Multimedia Home or Office Business Networks," Proceedings of the 35th Southeastern Symposium on System Theory, Morgantown, W. VA., Mar. 16-18, 2003, pp. 237-241.
Kwon G., and K.D. Ryu, "An Efficient Peer-to-Peer File Sharing Exploiting Hierarchy and Asymmetry," Proceedings of the 2003 Symposium on Applications and the Internet, Orlando, Fla., Jan. 27-31, 2003, pp. 226-233.
Qian, J., et al., "ACLA: A Framework for Access Control List (ACL) Analysis and Optimization," Fifth Joint Working Conference on Communications and Multimedia Security, Darnstadt, Germany, May 21-22, 2001, pp. 197-211.
Rao, J.R., "Some Performance Measures of File Sharing on Multiple Computer Systems," Proceedings of the Conference on Modeling and Simulation, vol. 6, Part I, Pittsburgh, Penn., Apr. 24-25, 1976, pp. 527-530.
Reinauer, R., "UNIX System V.# Remote File Sharing Capabilities and Administration," Unisphere 8(6):64-68, Sep. 1988.
Templin, P.J., Jr., "Providing a Centralized File Sharing Resource at Bucknell University", Proceedings of the User Services Conference for College and University Computing Services Organization, Bloomington, Ind., Oct. 25-28, 1998, pp. 289-292.

Yamai, N. et al., "NFS-Based Secure File Sharing Over Multiple Administrative Domains With Minimal Administration," Systems and Computers in Japan 33(14):50-58, Dec. 2002.

Yong Kyu Lee, et al., Metadata Management of the SANtopia File System, Proceedomgs of the 8th International Conference onParallel and Distributed Systems (ICPADS 2001), Kyoungju City, Korea, Jun. 26-29, 2001, pp. 492-499, IEEE Computer Society, 2001, ISBN 0-7695-1153-8.

Horst F. Wedde, et al., A Universal Framework for Managing Metadata in the Distributed Dragon Slayer System, Proceedings of the 26th EUROMICRO Conference (EUROMICRO'00), vol. 2, Maastricht, The Netherlands, Sep. 5-7, 2000, pp. 96-101, IEEE Computer Society, 2000, ISBN 1089-6503.

Jolon Faichney, et al., Goldleaf Hierarchical Document Browser, Second Australian User Interface Conference (AUIC'01), Gold Coast, Queensland, Australia, Jan. 29-Feb. 1, 2001, pp. 13-20, IEEE Computer Society, 2001, ISBN 0-7695-0969-X.

Dino Esposito, New Graphical Interface: Enhance Your Programs with New Windows XP Shell Features, MSDN Magazine, Nov. 2001, vol. 16, No. 11.

Stuart Yeates, et al., Tag Insertion Complexity, Data Compression Conference, (DCC 2001), Snowbird, Utah, USA, Mar. 27-29, 2001,pp. 243-252, IEEE Computer Society2001, ISBN 1068-0314.

Bipin C. Desal, et al., Resource Discovery: Modeling, Cataloguing and Searching, Seventh International Workshop on Database and Expert Systems Applications (DEXA '96), Zurich, Switzerland, Sep. 9-10, 1996, pp. 70-75, IEEE-CS Press, 1996, ISBN 0-8186-7662-0.

Gulrukh Ahanger, et al., Automatic Composition Techniques for Video Production, IEEE Transactions on Knowledge and Data Engineering, Nov./Dec. 1998, pp. 967-987, vol. 10, No. 6, IEEE Computer Society, 1998, ISBN 1041-4347.

Jane Hunter, An Overview of the MPEG-7 Description Language (DDL), IEEE Transactions on Circuits and Systems for Video Technology, Jun. 2001, pp. 765-772, vol. 11, No. 6, IEEE Computer Society, 2001, ISBN 1051-8215.

Philippe Salembier, et al., MPEG-7 Multimedia Description Schemes, IEEE Transactions on Circuits and Systems for Video Technology, Jun. 2001, pp. 748-759, vol. 11, No. 6, IEEE Computer Society, 2001, ISBN 1051-8215.

Thomas Sikora, The MPEG-7 Visual Standard for Content Description—An Overview, IEEE Transactions on Circuits and Systems for Video Technology, Jun. 2001, pp. 696-702, vol. 11, No. 6, IEEE Computer Society, 2001, ISBN 1051-8215.

B.S. Manjunath, et al., Color and Texture Descriptions, IEEE Transactions on Circuits and Systems for Video Technology, Jun. 2001, pp. 703-715, vol. 11, No. 6, IEEE Computer Society, 2001, ISBN 1051-8215.

G.D. Venolia, et al., Supporting Email Workflow. Microsoft Research Technical Report MSR-TR-2001-88. Revised Dec. 2001 (Original Sep. 2001). Microsoft Corporation, Redmond, VA.

G.D. Venolia and C. Neustaedter. Understanding Sequence and Reply Relationships within Email Converstations: A Mixed-Model Visualization. Microsoft Research Technical Report MSR-TR-2002-102. Sep. 23, 2002 (Revised Jan. 13, 2003).

Microsoft Digital Image Suite User's Manual, Version 9.0. pp 105-118, Available: http://www.microsoft.com/products/imaging/guides/SuiteManual.pdf, Apr. 30, 2004.

"Using Tags to Organize Your Photos.", Adobe Photoshop Album 2.0 Tutorial, Available: http://www.adobe.com/digitalimag/tips/phsaltaggin/pdfs/phsaltaggin.pdf, Apr. 30, 2004.

D. Esposito, "More Windows 2000 UI Goodies: Extending Explorer Views by Customizing Hypertext Template Files", MSDN Magazine, <http://msdn.microsoft.com/msdnmag/issues/0600/w2kui2/default.aspx?print=true?, first date of publication unknown but no later than Jun. 2000, 15 pages.

Microsoft: "Microsoft Windows 2000 Professional Step by Step—Lesson 3—Managing Files and Folders" <http://www.microsoft.com/mspress/books/sampshap/1589.asp>, Jan. 5, 2000, 12 pages.

D. Esposito, Visual C++ Windows Shell Programming, Dec. 1, 1998, Apress, ISBN 1861001843, pp. 463-469.

P. DiLascia, "More Fun with MFC:DIBs, Palettes, Subclassing, and a Gamut of Goodies, Part III", Microsoft Systems Journal, Jun. 1997, 20 pages.

Windows Commander, <http://web.archive.org/web/20030207145141/www.ghisler.com/featurel.htm> (Feb. 7, 2003) and <http://web.archive.org/web/20021017022627/www.ghisler.com/addons.htm> (Oct. 17, 2002), 7 pages.

Directory Opus 6.1—Viewer SDK Plugin SDK 1.0, GP Software, 2001, <http://web.archive.org/web/20030219151121/www.gpsoft.com.au/Developer.html>, first date of publication unknown but, prior to Feb. 19, 2003, 30 pages.

McFedries, Paul; "The Complete Idiot's Guide to Windows XP", Table of Contents, Oct. 3, 2001; Alpha Books, Ch. 6: Using My Computer to Fiddle w/h Files and Folder-printed p. 1-6, Finding a File in Mess p. 103.

Cohen, et al., "A Case for Associative Peer to Peer Overlays"—ACM SIGCOMM Computer Communications Review, vol. 33, No. 1, Jan. 2003, pp. 95-100.

Lui, et al., "Interoperability of Peer-to-Peer File Sharing Protocols"—ACM SIGecom Exchanges, vol. 3, No. 3, Aug. 2002, pp. 25-33.

Langer, Maria, Mac OS X: Visual QuickStart Guide; Apr. 2001, Peachpit Press, Mac OS X Disk Organization (pp. 1-3), Views (pp. 1-11), Outlines (1-3).

Ray, Jay, Mac OS X Unleashed, Nov. 2001, Sams, Chapter 4. The Finder: Working with Files and Applications (pp. 1-15), Getting File Information (pp. 1-7).

Bott, et al., Book titled "Special Edition Using Windows 98, Second Edition", Dec. 21, 1999, second edition, pp. 1-7.

Kuchinsky, et al., "FotoFile: A Consumer Multimedia Organization and Retrieval System", May 1999, ACM, pp. 496-503.

Windows Commander (website), <URL: http://www.ghisler.com>, accessed using http://www.archive.org/web/web.php, in particular, http://web.archive.org/web/20030207145141/www.ghisler.com/featurel.htm, archived on Feb. 7, 2003; http://web.archive.org/web/20021017022627/www.ghisler.com/addons.htm, archived on Oct. 17, 2002; http://web.archive.org/web/20021009213316/www.ghisler.com/efaquser.htm, archived on Oct. 9, 2003; unable to access website.

Bott, et al., "Microsoft Windows XP Inside Out", Microsoft Press, 2001, Chapter 11, 39 pages.

PCT Search Report and Written Opinion for International Application PCT/US06/29633, 9 pages.

* cited by examiner

| | Song Title | Time | Album | Genre | Rating | Count |
|---|---|---|---|---|---|---|
| Filter by: 207 | | | | | | |
| Music Links | | | | | | |
| All Songs —209 | • Scooter | 3:06 | Music For the Morning | Alternative Country | ★★★ | 1 |
| Online Store —211 | • Sleep Alone | 6:34 | Great Expectations Soun... | Alternative Country | ★★★★ | 5 |
| iPod —213 | • Metro Area | 8:23 | Great Expectations Soun... | Alternative Country | ★★ | 6 |
| Recently played —215 | • Hollywood | 1:21 | Great Expectations Soun... | Electronic | ★★★★★ | 2 |
| Rating —217 | • If I were you | 2:32 | Great Expectations Soun... | Electronic | ★★★★ | 3 |
| Playlists —219 | • Mad World | 6:56 | A Bugged out Mix | Electronic | ★ | 23 |
| Artists —221 | • Silk Road | 3:06 | A Bugged out Mix | Electronic | ★★★ | 7 |
| Genre —223 | • Dust | 6:34 | A Bugged out Mix | Electronic | ★★ | 10 |
| | • Encounter | 8:23 | Time for A Dance | Pop | ★★★★★ | 8 |
| 203 | • Forest | 1:21 | Come Away with Me | Pop | ★★★★ | 50 |
| | • Hippies t h... | 2:32 | Come Away with Me | Rock | ★★★★ | 10 |
| 205 | • Spread YW... | 6:56 | Come Away with Me | Rock | ★★★★★ | 23 |
| | • Down to Up... | 3:06 | Come Away with Me | Rock | ★★★★ | 50 |
| | • Top | 1:21 | Come Away with Me | Rock | ★ | 10 |
| | • Rough Jump | 1:21 | Come Away with Me | Rock | ★★★ | 23 |
| | • Run Around | 2:32 | Come Away with Me | Rock | ★ | 50 |
| | • Tweet | 6:56 | Great Expectations Soun... | Soundtrack | ★★ | 3 |
| | • Just You | 3:06 | Great Expectations Soun... | Soundtrack | ★★★★★ | 53 |

↑ 201

View

FIG. 2

| Filter by: | Song Title | Time | Album | Genre | Rating | Count |
|---|---|---|---|---|---|---|
| Music Links ▾ | | | | | | |
| All Songs | Scooter | 3:06 | Music For the Morning | Alternative Country | ★★★ | 1 |
| Online Store | Sleep Alone | 6:34 | Great Expectations Soun... | Alternative Country | ★★★★ | 5 |
| iPod —213 | Metro Area | 8:23 | Great Expectations Soun... | Alternative Country | ★★ | 6 |
| Recently played | Hollywood | 1:21 | Great Expectations Soun... | Electronic | ★★★★★ | 2 |
| Rating—217 | If I were you | 2:32 | Great Expectations Soun... | Electronic | ★ | 3 |
| Playlists—219 | Mad World | 6:56 | A Bugged out Mix | Electronic | ★★★★ | 23 |
| Artists—221 | Silk Road | 3:06 | A Bugged out Mix | Electronic | ★★★ | 7 |
| Genre—223 | Dust | 6:34 | A Bugged out Mix | Electronic | ★★ | 10 |
| | Encounter | 8:23 | Time for A Dance | Pop | ★★★★★ | 8 |
| | Forest | 1:21 | Come Away with Me | Pop | ★★★ | 50 |
| | Hippies I h... | 2:32 | Come Away with Me | Rock | ★★★★ | 10 |
| | Spread YW... | 6:56 | Come Away with Me | Rock | ★★ | 23 |
| | Down to Up... | 3:06 | Come Away with Me | Rock | ★★★★★ | 50 |
| | Top | 1:21 | Come Away with Me | Rock | ★ | 10 |
| | Rough Jump | 2:32 | Come Away with Me | Rock | ★★★ | 23 |
| | Run Around | 6:56 | Great Expectations Soun... | Soundtrack | ★★★★★ | 50 |
| | Tweet | 3:06 | Great Expectations Soun... | Soundtrack | ★★ | 3 |
| | Just You | | | | ★★★★★ | 53 |

FIG. 3

| Song Title | Time | Album | Genre | Rating | Count |
|---|---|---|---|---|---|
| Scooter | 3:06 | Music For the Morning | Alternative Country | ★★★ | 1 |
| Sleep Alone | 6:34 | Great Expectations Soun... | Alternative Country | ★★★★ | 5 |
| Metro Area | 8:23 | Great Expectations Soun... | Alternative Country | ★★ | 6 |
| Hollywood | 1:21 | Great Expectations Soun... | Electronic | ★★★★★ | 2 |
| If I were you | 2:32 | Great Expectations Soun... | Electronic | ★★★ | 3 |
| Mad World | 6:56 | A Bugged out Mix | Electronic | ★ | 23 |
| Silk Road | 3:06 | A Bugged out Mix | Electronic | ★★★ | 7 |
| Dust | 6:34 | A Bugged out Mix | Electronic | ★★ | 10 |
| Encounter | 8:23 | Time for A Dance | Pop | ★★★★★ | 8 |
| Forest | 1:21 | Come Away with Me | Pop | ★★★★ | 50 |
| Hippies I h... | 2:32 | Come Away with Me | Rock | ★★ | 10 |
| Spread YW... | 6:56 | Come Away with Me | Rock | ★★★★★ | 23 |
| Down to Up... | 3:06 | Come Away with Me | Rock | ★★★★ | 50 |
| Top | 1:21 | Come Away with Me | Rock | ★ | 10 |
| Rough Jump | 1:21 | Come Away with Me | Rock | ★★★★ | 23 |
| Run Around | 2:32 | Come Away with Me | Rock | ★★★★ | 50 |
| Tweet | 6:56 | Great Expectations Soun... | Soundtrack | ★★ | 3 |
| Just You | 3:06 | Great Expectations Soun... | Soundtrack | ★★★★ | 53 |

FIG. 4

| Song Title | Time | Album | Genre | Rating | Count |
|---|---|---|---|---|---|
| Scooter | 3:06 | Music For the Morning | Alternative Country | ★★★ | 1 |
| Sleep Alone | 6:34 | Great Expectations Soun... | Alternative Country | ★★★★ | 5 |
| Metro Area | 8:23 | Great Expectations Soun... | Alternative Country | ★★ | 6 |
| Hollywood | 1:21 | Great Expectations Soun... | Electronic | ★★★★ | 2 |
| If I were you | 2:32 | Great Expectations Soun... | Electronic | ★★★★★ | 3 |
| Mad World | 6:56 | A Bugged out Mix | Electronic | ★ | 23 |
| Silk Road | 3:06 | A Bugged out Mix | Electronic | ★★★ | 7 |
| Dust | 6:34 | A Bugged out Mix | Electronic | ★★ | 10 |
| Encounter | 8:23 | Time for A Dance | Pop | ★★★★★ | 8 |
| Forest | 1:21 | Come Away with Me | Pop | ★★★★ | 50 |
| Hippies I h... | 2:32 | Come Away with Me | Rock | ★★★★ | 10 |
| Spread YW... | 6:56 | Come Away with Me | Rock | ★★ | 23 |
| Down to Up... | 3:06 | Come Away with Me | Rock | ★★★★★ | 50 |
| Tap | 1:21 | Come Away with Me | Rock | ★ | 10 |
| Rough Jump | 1:21 | Come Away with Me | Rock | ★★★★ | 23 |
| Run Around | 2:32 | Come Away with Me | Rock | ★★★ | 50 |
| Tweet | 6:56 | Great Expectations Soun... | Soundtrack | ★★ | 3 |
| Just You | 3:06 | Great Expectations Soun... | Soundtrack | ★★★★★ | 53 |

FIG. 5

| Filter by... | Song Title | Time | Album | Genre | Rating | Count |
|---|---|---|---|---|---|---|
| Music Links ▼ | | | | | | |
| All Songs | Scooter | 3:06 | Music For the Morning | Alternative Country | ★★★ | 1 |
| Online Store | Sleep Alone | 6:34 | Great Expectations Soun... | Alternative Country | ★★★★ | 5 |
| iPod | Metro Area | 8:23 | Great Expectations Soun... | Alternative Country | ★★ | 6 |
| Recently played | Hollywood | 1:21 | Great Expectations Soun... | Electronic | ★★★★★ | 2 |
| Rating | If I were you | 2:32 | Great Expectations Soun... | Electronic | ★★★ | 3 |
| Playlists | Mad World | 6:56 | A Bugged out Mix | Electronic | ★ | 23 |
| Artists—221 | Silk Road | 3:06 | A Bugged out Mix | Electronic | ★★★★ | 7 |
| Madonna—643 | Dust | 6:34 | A Bugged out Mix | Electronic | ★★ | 10 |
| 50 Cent—645 | Encounter | 8:23 | Time for A Dance | Pop | ★★★★★ | 8 |
| Chocolate—647, 649 | Forest | 1:21 | Come Away with Me | Pop | ★★★★ | 50 |
| Kruder & Dorfmei... | Hippies I h... | 2:32 | Come Away with Me | Rock | ★★★★ | 10 |
| Eminem—651 | Spread YW... | 6:56 | Come Away with Me | Rock | ★★ | 23 |
| —653 | Down to Up... | 3:06 | Come Away with Me | Rock | ★★★★★ | 50 |
| Genre | Top | 1:21 | Come Away with Me | Rock | ★ | 10 |
| View 203 | Rough Jump | 1:21 | Come Away with Me | Rock | ★★★ | 23 |
| | Run Around | 2:32 | Come Away with Me | Rock | ★★★ | 50 |
| | Tweet | 6:56 | Great Expectations Soun... | Soundtrack | ★★ | 3 |
| | Just You | 3:06 | Great Expectations Soun... | Soundtrack | ★★★★★ | 53 |

FIG. 6

| | Song Title | Time | Album | Genre | Rating | Count |
|---|---|---|---|---|---|---|
| Filter by: | | | | | | |
| Music Links ▼ | | | | | | |
| ☐ All Songs | • Scooter | 3:06 | Music For the Morning | Alternative Country | ★★★ | 1 |
| ☐ Online Store | • Sleep Alone | 6:34 | Great Expectations Soun... | Alternative Country | ★★★★ | 5 |
| ⊞ ☐ iPod | • Metro Area | 8:23 | Great Expectations Soun... | Alternative Country | ★★ | 6 |
| | • Hollywood | 1:21 | Great Expectations Soun... | Electronic | ★★★★★ | 2 |
| ⊕ ☆ Recently played | • If I were you | 2:32 | Great Expectations Soun... | Electronic | ★★★ | 3 |
| ⊕ ☆ Rating | • Mad World | 6:56 | A Bugged out Mix | Electronic | ★ | 23 |
| ⊞ ▦ Playlists | • Silk Road | 3:06 | A Bugged out Mix | Electronic | ★★ | 7 |
| ⊕ ☉ Artists | • Dust | 6:34 | A Bugged out Mix | Electronic | | 10 |
| ○ Madonna | • Encounter | 8:23 | Time for A Dance | Pop | ★★★★ | 8 |
| ○ 50 Cent | • Forest | 1:21 | Come Away with Me | Pop | ★★★ | 50 |
| ○ Chocolate | • Hippies I h... | 2:32 | Come Away with Me | Rock | ★ | 10 |
| ○ Kruder & Dorfmei... | • Spread Yw... | 6:56 | Come Away with Me | Rock | ★★★★ | 23 |
| ○ Eminem | • Down to Up... | 3:06 | Come Away with Me | Rock | ★★★★★ | 50 |
| | • Top | 1:21 | Come Away with Me | Rock | ★ | 10 |
| | • Rough Jump | 1:21 | ...with Me | Rock | ★★★★ | 23 |
| 861—Ge 4uoze - Chocolate 871→ | | 2:32 | 881 4 - C ▲ | Soundtrack | ★★ | 3 |
| 863—De Dijk - K3 873→ | | 6:56 | D - K ▲ | | | |
| 865—Kruder... - Night Vision 875→ | | 3:06 | L - N ▲ | Soundtrack | ★★★★★ | 53 |
| 867—OxyGen - Prince 877→ | | | O - P ▲ | | | |
| 869—Sheryl Crowe - ZZ Top 879 | | | S - Z ▲ | | | |
| 859 | | | | | | |

FIG. 8

| | Song Title | Time | Album | Genre | Rating | Count |
|---|---|---|---|---|---|---|
| Filter by... | | | | | | |
| Music Links ▼ | | | | | | |
| ☐ All Songs | • Scooter | 3:06 | Music For the Morning | Alternative Country | ★★★ | 1 |
| ☐ Online Store | • Sleep Alone | 6:34 | Great Expectations Soun... | Alternative Country | ★★★★ | 5 |
| ☐ iPod | • Metro Area | 8:23 | Great Expectations Soun... | Alternative Country | ★★ | 6 |
| ⊞ ⊙ Recently played | • Hollywood | 1:21 | Great Expectations Soun... | Electronic | ★★★★★ | 2 |
| | • If I were you | 2:32 | Great Expectations Soun... | Electronic | ★★★★ | 3 |
| ⊞ ♡ Rating | • Mad World | 6:56 | A Bugged out Mix | Electronic | ★ | 23 |
| ⊞ ▦ Playlists | • Silk Road | 3:06 | A Bugged out Mix | Electronic | ★★★★ | 7 |
| ⊞ ⊙ Artists | • Dust | 6:34 | A Bugged out Mix | Electronic | ★★★ | 10 |
| ⊙ Madonna | • Encounter | 8:23 | Time for A Dance | Pop | ★★★★★ | 8 |
| ⊙ 50 Cent | • Forest | 1:21 | Come Away with Me | Pop | ★★★★ | 50 |
| ⊙ Chocolate ─985 | • Hippies I h... | 2:32 | Come Away with Me | Rock | ★★★★★ | 10 |
| ⊙ Kruder & Dorfmeister | • Spread YW... | 6:56 | Come Away with Me | Rock | ★★★★ | 23 |
| 983 | • Down to Up... | 3:06 | Come Away with Me | Rock | ★★★★★ | 50 |
| ⊙ Eminem | • Top | 1:21 | Come Away with Me | Rock | ★ | 10 |
| ▶ | • Rough Jump | 1:21 | Come Away with Me | Rock | ★★★ | 23 |
| ⊞ ⊙ Genre | • Run Around | 2:32 | Great Expectations Soun... | Rock | ★★★ | 50 |
| ▦ View | • Tweet | 6:56 | Great Expectations Soun... | Soundtrack | ★★ | 3 |
| ▦ | • Just You | 3:06 | Great Expectations Soun... | Soundtrack | ★★★★★ | 53 |

FIG. 9

| | Song Title | Time | Album | Genre | Rating | Count |
|---|---|---|---|---|---|---|
| Filter by... | | | | | | |
| Music Links ▼ | | | | | | |
| 🗀 All Songs | • Scooter | 3:06 | Music For the Morning | Alternative Country | ★★★ | 1 |
| 🗀 Online Store | • Sleep Alone | 6:34 | Great Expectations Soun... | Alternative Country | ★★★★ | 5 |
| ⊞ 🗀 iPod | • Metro Area | 8:23 | Great Expectations Soun... | Alternative Country | ★★ | 6 |
| | • Hollywood | 1:21 | Great Expectations Soun... | Electronic | ★★★★ | 2 |
| ⊙ Recently played | • If I were you | 2:32 | Great Expectations Soun... | Electronic | ★★★ | 3 |
| ⊞ ☆ Rating | • Mad World | 6:56 | A Bugged out Mix | Electronic | ★ | 23 |
| ⊞ 🗐 Playlists | • Silk Road | 3:06 | A Bugged out Mix | Electronic | ★★★ | 7 |
| ⊞ ⊙ Artists—221 | • Dust | 6:34 | A Bugged out Mix | Electronic | ★★ | 10 |
| | ⊙ Encounter | 8:23 | Time For A Dance | Pop | ★★★★★ | 8 — 1097 |
| 1087— ☐ ⊙ Madonna | • Forest | 1:21 | Come Away with Me | Pop | ★★★ | 50 |
| 1089— ☑ ⊙ 50 Cent | • Hippies I h... | 2:32 | Come Away with Me | Rock | ★★★★ | 10 |
| 1091— ☐ ⊙ Chocolate | • Spread YW... | 6:56 | Come Away with Me | Rock | ★ | 23 |
| 1093— ☐ ⊙ Kruder & Dorim... | • Down to Up... | 3:06 | Come Away with Me | Rock | ★★★★★ | 50 |
| 1095— ☐ ⊙ Eminem | • Top | 1:21 | Come Away with Me | Rock | ★★★ | 10 |
| ▸ | • Rough Jump | 2:32 | Come Away with Me | Rock | ★ | 23 |
| ⊞ ⊙ Genre | • Run Around | — 205 | | | | 50 |
| | • Tweet | 6:56 | Great Expectations Soun... | Soundtrack | ★★ | 3 |
| ▤▤ View | • Just You | 3:06 | Great Expectations Soun... | Soundtrack | ★★★★ | 53 |

FIG. 10

| | Song Title | Time | Album | Genre | Rating | Count |
|---|---|---|---|---|---|---|
| | Scooter | 3:06 | Music For the Morning | Alternaive Country | ★★★ | 1 |
| | Sleep Alone | 6:34 | Great Expectations Soun... | Alternaive Country | ★★★★ | 5 |
| 205 | Metro Area | 8:23 | Great Expectations Soun... | Alternaive Country | ★★ | 6 |
| | | | Great Expectations Soun... | Electronic | ★★★★★ | 2 |
| | | | A Bugged out Mix | Electronic | ★ | 3 |
| | | | A Bugged out Mix | Electronic | ★★★ | 23 |
| | | | A Bugged out Mix | Electronic | ★★ | 7 |
| | | | Time for a dance | Pop | ★★★★★ | 10 |
| | | | Come Away with Me | Pop | ★★★ | 8 |
| | | | Come Away with Me | Rock | ★★★★ | 50 |
| | | | Come Away with Me | Rock | ★★ | 10 |
| | | | Come Away with Me | Rock | ★★★★★ | 23 |
| | | | Come Away with Me | Rock | ★★★ | 50 |
| | | | Great Expectations Soun... | Soundtrack | ★★ | 10 |
| | | | Great Expectations Soun... | Soundtrack | ★★★★★ | 23 |
| | | | | | | 50 |
| | | | | | | 3 |
| | | | | | | 53 |

Filter by...

Music Links ▼
☐ All Songs
☐ Online Store
☐ iPod
☐ Recently p...
  ☐ 4luoze Matroze
  ☑ 50 Cent
  ☐ AC DC
  ☐ Blues Brothers
  ☐ Chemical Brothers
  ☐ Chocolate
  ☐ De Dijk
  ☐ Dorfmeister
  ☐ Eminem
  ☐ Golden Earring
  ☐ Grateful Dead
  ☐ K3
  ☐ Kruder & Dorfmeister
  ☐ Madonna
  ☐ Melany C
  ☐ Moby
  ☐ Night Vision
  ☐ OxyGen
  ☐ Paul Oakenfold
  ☐ Peter Ford
  ☐ Prince
  ☐ Sheryl Crowe
  ☐ The Righteous Brothers
  ☐ ZZ Top
☐ Rating
☐ Playlists
☐ Artists
  ☐ Mado...
  ☑ 50 Ce...
  ☐ Choco...
  ☐ Krude...
  ☐ Emine...
653 ─┐
   ☐ Genre
     1101
View

| | Song Title | Time | Album | Genre | Rating | Count |
|---|---|---|---|---|---|---|
| | Scooter | 3:06 | Music For the Morning | Alternative Country | ★★★ | 1 |
| | Sleep Alone | 6:34 | Great Expectations Soun... | Alternative Country | ★★★★ | 5 |
| | Metro Area | 8:23 | Great Expectations Soun... | Alternative Country | ★★ | 6 |
| | Hollywood | 1:21 | Great Expectations Soun... | Electronic | ★★★★★ | 2 |
| | If I were you | 2:32 | Great Expectations Soun... | Electronic | ★★★ | 3 |
| | Mad World | 6:56 | A Bugged out Mix | Electronic | ★ | 23 |
| | Silk Road | 3:06 | A Bugged out Mix | Electronic | ★★★ | 7 |
| | Dust | 6:34 | A Bugged out Mix | Electronic | ★★ | 10 |
| | | | Time for A Dance | Pop | ★★★★★ | 8 |
| | | | Come Away with Me | Pop | ★★★ | 50 |
| | | | Come Away with Me | Rock | ★★★★ | 10 |
| | | | Come Away with Me | Rock | ★★ | 23 |
| | | | Come Away with Me | Rock | ★★★★★ | 50 |
| | | | Come Away with Me | Rock | ★★★ | 10 |
| | Tweet | 6:56 | Great Expectations Soun... | Soundtrack | ★ | 23 |
| | Just You | 3:06 | Great Expectations Soun... | Soundtrack | ★★ | 3 |
| | | | | | ★★★★★ | 53 |

Context menu (popup):
- Show All Music by Artist —1207
- Add new Artist —1209
- Rename —1211
- Move Up —1213
- Move Down —1215
- Add / Remove Music Links Sidebar:
- Filter by:
- Music Links
- All Songs
- Online Store
- iPod
- Recently played
- Rating
- Playlists
- Artists —221
  - Madonna
  - 50 Cent
  - Chocolate —1205
  - Kruder &...
  - Eminem
- Genre
- View

| Filter by | Song Title | Time | Album | Genre | Rating | Count |
|---|---|---|---|---|---|---|
| Music Links ▼ | | | | | | |
| ☐ All Songs | • Scooter | 3:06 | Music For the Morning | Alternative Country | ★★★ | 1 |
| ☐ Online Store | • Sleep Alone | 6:34 | Great Expectations Soun... | Alternative Country | ★★★★ | 5 |
| ⊞ ☐ iPod | • Metro Area | 8:23 | Great Expectations Soun... | Alternative Country | ★★ | 6 |
| | • Hollywood | 1:21 | Great Expectations Soun... | Electronic | ★★★★★ | 2 |
| ⊕ Recently played | • If I were you | 2:32 | Great Expectations Soun... | Electronic | ★★★ | 3 |
| ⊞ ☆ Rating | • Mad World | 6:56 | A Bugged out Mix | Electronic | ★ | 23 |
| ⊞ ▤ Playlists | • Silk Road | 3:06 | A Bugged out Mix | Electronic | ★★★ | 7 |
| ⊟ ♪ Artists | • Dust | 6:34 | A Bugged out Mix | Electronic | ★★ | 10 |
| ♀ Madonna | • Encounter | 8:23 | Time for A Dance | Pop | ★★★★★ | 8 |
| ♀ 50 Cent | • Forest | 1:21 | Come Away with Me | Pop | ★★★★ | 50 |
| ♀ Chocolate | • Hippies I h... | 2:32 | Come Away with Me | Rock | ★★★★ | 10 |
| ♀ Kruder & Dorfmei... | • Spread YW... | 6:56 | Come Away with Me | Rock | ★★ | 23 |
| 1317 ♀ Eminem | • Down to Up... | 3:06 | Come Away with Me | Rock | ★★★★★ | 50 |
| ♀ _New Artist_ | • Top | 1:21 | Come Away with Me | Rock | ★★★ | 10 |
| ▶ ↙ 203 | • Rough Jump | 1:21 | Come Away with Me | Rock | ★ | 23 |
| | • Run Around | 2:32 | Come Away with Me | Rock | ★★★ | 50 |
| ⊞ ♫ Genre | • Tweet | 6:56 | Great Expectations Soun... | Soundtrack | ★★ | 3 |
| ▤▤ View | • Just You | 3:06 | Great Expectations Soun... | Soundtrack | ★★★★ | 53 |

FIG. 13

| filter by... | | | | | |
|---|---|---|---|---|---|
| | Song Title | Time | Album | Genre | Rating | Count |
| Music Links ▼ | | | | | | |
| 📄 All Songs | • Scooter | 3:06 | Music For the Morning | Alternative Country | ★★★ | 1 |
| 📄 Online Store | • Sleep Alone | 6:34 | Great Expectations Soun... | Alternative Country | ★★★★ | 5 |
| ⊞ 📄 iPod | • Metro Area | 8:23 | Great Expectations Soun... | Alternative Country | ★★ | 6 |
| | • Hollywood | 1:21 | Great Expectations Soun... | Electronic | ★★★★★ | 2 |
| ⊕ Recently played | • If I were you | 2:32 | Great Expectations Soun... | Electronic | ★★★ | 3 |
| ⊞ ☆ Rating | • Mad World | 6:56 | A Bugged out Mix | Electronic | ★ | 23 |
| ⊟ 📄 Playlists—219  —1419 | • Silk Road | 3:06 | A Bugged out Mix | Electronic | ★★★ | 7 |
| 📄 Haloween Party —1421 | • Dust | 6:34 | A Bugged out Mix | Electronic | ★★ | 10 |
| 📄 Coast to Coast trip | • Encounter | 8:23 | Time for A Dance | Pop | ★★★★★ | 8 |
| 📄 Xmas 2003—1423 | • Forest | 1:21 | Come Away with Me | Pop | ★★★ | 50 |
| ↳—1425 | • Hippies t h... | 2:32 | Come Away with Me | Rock | ★★★★★ | 10 |
| | • Spread YW... | 6:56 | Come Away with Me | Rock | ★★★★ | 23 |
| ◇ Artists | • Down to Up... | 3:06 | Come Away with Me | Rock | ★★★ | 50 |
| ◯ Genre | • Top | 1:21 | Come Away with Me | Rock | ★ | 10 |
| ↑ 203 | • Rough Jump | 2:32 | Great Expectations Soun... | Rock | ★★★ | 23 |
| | • Run Around | 6:56 | Come Away with Me | Rock | ★ | 50 |
| | • Tweet | 3:06 | Great Expectations Soun... | Soundtrack | ★★ | 3 |
| ⊞ View | • Just You | | Great Expectations Soun... | Soundtrack | ★★★★ | 53 |

FIG. 14

| | Song Title | Time | Album | Genre | Rating | Count |
|---|---|---|---|---|---|---|
| Filter by... | | | | | | |
| Music Links ▸ | | | | | | |
| 🗀 All Songs | • Scooter | 3:06 | Music For the Morning | Alternative Country | ★★★ | 1 |
| 🗀 Online Store | • Sleep Alone | 6:34 | Great Expectations Soun... | Alternative Country | ★★★★ | 5 |
| ⊞ 🎵 iPod | • Metro Area | 8:23 | Great Expectations Soun... | Alternative Country | ★★ | 6 |
| | • Hollywood | 1:21 | Great Expectations Soun... | Electronic | ★★★★★ | 2 |
| ⊙ Recently played | • If I were you | 2:32 | Great Expectations Soun... | Electronic | ★★★ | 3 |
| ⊞ ☆ Rating | • Mad World | 6:56 | A Bugged out Mix | Electronic | ★ | 23 |
| ⊞ 📁 Playlists—219  1419 | • Silk Road | 3:06 | A Bugged out Mix | Electronic | ★★★ | 7 |
| ⊞ 📁 Haloween Party 1421 | • Dust | 6:34 | A Bugged out Mix | Electronic | ★★ | 10 |
| ⊞ 📁 Coast to Coast trip | • Encounter | 8:23 | Time for A Dance | Pop | ★★★★★ | 8 |
| ⊞ 📁 Cruising—1527 | • Forest | 1:21 | Come Away with Me | Pop | ★★★ | 50 |
| ⊞ 📁 Specials—1529 | • Hippies I h... | 2:32 | Come Away with Me | Rock | ★★★★ | 10 |
|    📁 Mountain High 1531 | • Spread YW... | 6:56 | Come Away with Me | Rock | ★★ | 23 |
|    📁 Beach Songs 1533 | • Down to Up... | 3:06 | Come Away with Me | Rock | ★★★★★ | 50 |
| ⊞ 📁 Xmas 2003 | • Top | 1:21 | Come Away with Me | Rock | ★ | 10 |
|    1423 | • Rough Jump | 2:32 | Come Away with Me | Rock | ★★★ | 23 |
| ▸ ↑ 203 | • Run Around | 6:56 | Come Away with Me | Rock | ★ | 50 |
| | • Tweet | 3:06 | Great Expectations Soun... | Soundtrack | ★★ | 3 |
| View | • Just You | | Great Expectations Soun... | Soundtrack | ★★★★★ | 53 |

FIG. 15

| Song Title | Time | Album | Genre | Rating | Count |
|---|---|---|---|---|---|
| Scooter | 3:06 | Music For the Morning | Alternative Country | ★★★ | 1 |
| Sleep Alone | 6:34 | Great Expectations Soun... | Alternative Country | ★★★★ | 5 |
| Metro Area | 8:23 | Great Expectations Soun... | Alternative Country | ★★ | 6 |
| Hollywood | 1:21 | Great Expectations Soun... | Electronic | ★★★★★ | 2 |
| If I were you | 2:32 | Great Expectations Soun... | Electronic | ★★★ | 3 |
| | | A Bugged out Mix | Electronic | ★ | 23 |
| | | A Bugged out Mix | Electronic | ★★ | 7 |
| | | A Bugged out Mix | Electronic | ★★★ | 10 |
| | | Time for A Dance | Pop | ★★★★★ | 8 |
| | | Come Away with Me | Pop | ★★★ | 50 |
| | | Come Away with Me | Rock | ★★★★ | 10 |
| | | Come Away with Me | Rock | ★★★★★ | 23 |
| | | Come Away with Me | Rock | ★★★ | 50 |
| Run Around | 2:32 | Come Away with Me | Rock | ★ | 10 |
| Tweet | 6:56 | Great Expectations Soun... | Soundtrack | ★★ | 23 |
| Just You | 3:06 | Great Expectations Soun... | Soundtrack | ★★★★ | 50 |
|  |  |  |  |  | 3 |
|  |  |  |  |  | 53 |

Context menu:
- Show 'Recently played' — 1643
- Specific node task 1 — 1645
- Specific node task 2 — 1647
- Delete — 1649    1641
- Rename — 1651
- Move Up — 1653
- Move Down — 1655
- Add / Remove Music Links Sidebar:
- Filter by...
- Music Links
- All Songs
- Online Store
- iPod — 1637
- Recently played — 215
- Rating — 1635
- Playlists
- Artists
- Genre

203

View

FIG. 16

| Song Title | Time | Album | Genre | Rating | Count |
|---|---|---|---|---|---|
| Scooter — 1763 | 3:06 | Music For the Morning | Alternative Country | ★★★ | 1 |
| | 6:34 | Great Expectations Soun... | Alternative Country | ★★★★ | 5 |
| Add Current Page to Music Links | 8:23 | Great Expectations Soun... | Alternative Country | ★★ | 6 |
| Sort Music Links by — 1765 | 1:21 | Great Expectations Soun... | Electronic | ★★★★★ | 2 |
| Hide Pane — 1767 | 2:32 | Great Expectations Soun... | Electronic | ★★★ | 3 |
| Add / Remove Music Links — 1769 | 6:56 | A Bugged out Mix | Electronic | ★ | 23 |
| Silk Road | 3:06 | A Bugged out Mix | Electronic | ★★★ | 7 |
| Dust | 6:34 | A Bugged out Mix | Electronic | ★★ | 10 |
| Encounter | 8:23 | Time for A Dance | Pop | ★★★★★ | 8 |
| Forest | 1:21 | Come Away with Me | Pop | ★★★ | 50 |
| Hippies I h... | 2:32 | Come Away with Me | Rock | ★★ | 10 |
| Spread YW... | 6:56 | Come Away with Me | Rock | ★★★★★ | 23 |
| Down to Up... | 3:06 | Come Away with Me | Rock | ★★★★ | 50 |
| Top | 1:21 | Come Away with Me | Rock | ★ | 10 |
| Rough Jump | 1:21 | Come Away with Me | Rock | ★★★ | 23 |
| Run Around | 2:32 | Come Away with Me | Rock | ★★★ | 50 |
| Tweet | 6:56 | Great Expectations Soun... | Soundtrack | ★★ | 3 |
| Just You | 3:06 | Great Expectations Soun... | Soundtrack | ★★★★★ | 53 |

| | Song Title | Time | Album | Genre | Rating | Count |
|---|---|---|---|---|---|---|
| Filter by: | | | | | | |
| Music Links ▾ | | | | | | |
| All Songs | • Scooter | 3:06 | Music For the Morning | Alternative Country | ★★★ | 1 |
| Online Store | • Sleep Alone | 6:34 | Great Expectations Soun... | Alternative Country | ★★★★ | 5 |
| iPod | • Metro Area | 8:23 | Great Expectations Soun... | Alternative Country | ★★ | 6 |
| Recently played | • Hollywood | 1:21 | Great Expectations Soun... | Electronic | ★★★★★ | 2 |
| Rating | • If I were you | 2:32 | Great Expectations Soun... | Electronic | ★★★ | 3 |
| Playlists —1875 | • Mad World | 6:56 | A Bugged out Mix | Electronic | ★ | 23 |
| Artist —1873 | • Silk Road | 3:06 | A Bugged out Mix | Electronic | ★★★ | 7 |
| Genre | • Dust | 6:34 | A Bugged out Mix | Electronic | ★★ | 10 /1871 |
| | Encounter | 8:23 | Time for a Dance | Pop | ★★★★★ | 8 |
| 203 ← 205 | • Forest | 1:21 | Come Away with Me | Pop | ★★★ | 50 |
| | • Hippies I h... | 2:32 | Come Away with Me | Rock | ★★★★ | 10 |
| | • Spread YW... | 6:56 | Come Away with Me | Rock | ★★ | 23 |
| | • Down to Up... | 3:06 | Come Away with Me | Rock | ★★★★★ | 50 |
| | • Top | 1:21 | Come Away with Me | Rock | ★★★ | 10 |
| | • Rough Jump | 1:21 | Come Away with Me | Rock | ★ | 23 |
| | • Run Around | 2:32 | Come Away with Me | Rock | ★ | 50 |
| | • Tweet | 6:56 | Great Expectations Soun... | Soundtrack | ★★★ | 3 |
| | • Just You | 3:06 | Great Expectations Soun... | Soundtrack | ★★★★★ | 53 |

View

FIG. 19

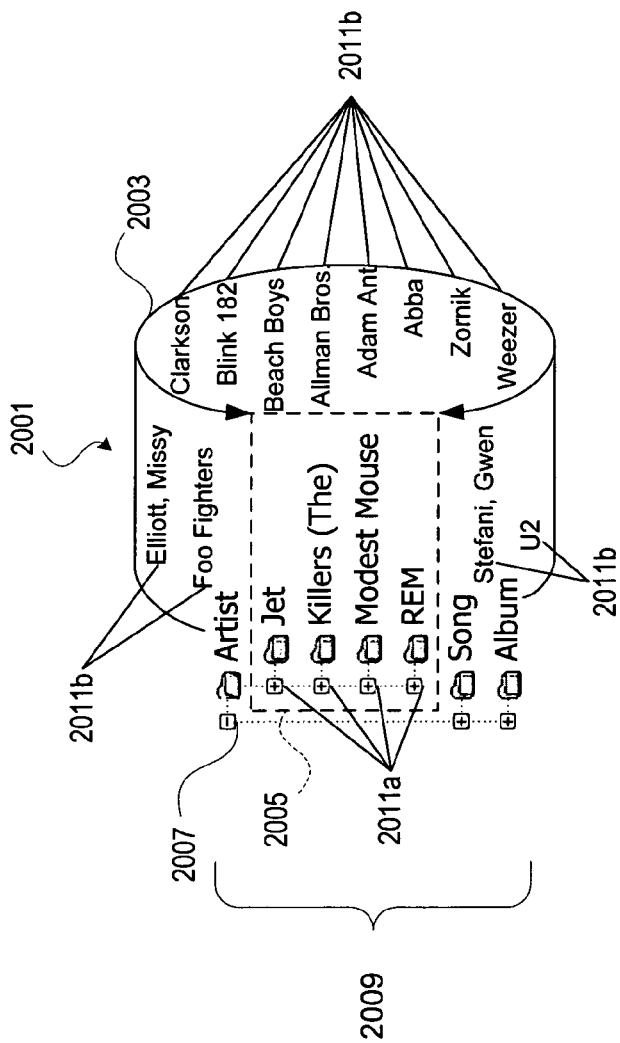
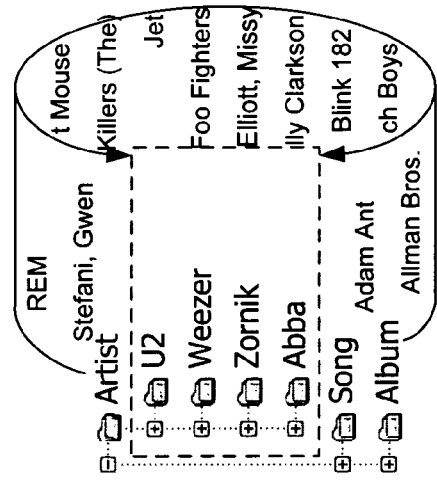
FIG. 20
FIG. 21

CAROUSEL CONTROL FOR METADATA NAVIGATION AND ASSIGNMENT

CROSS REFERENCE TO RELATED CASES

The present application is a continuation-in-part of co-pending application Ser. No. 10/837,487, filed Apr. 30, 2004, and entitled "Property Tree for Metadata Navigation and Assignment," which is herein incorporated by reference.

BACKGROUND

Today most computer users interact with the machine by way of a graphical user interface which, by exploiting the computer's visual display and intuitive input devices such as the mouse, mediates access to the operating system, application programs, and stored data. The standard approach to the design of the user interface has relied on a simple visual metaphor in which data files are contained in folders organized within a hierarchically-structured file system tree. The user interface provides controls that permit the user to navigate through the file system tree in order to locate and act upon data. Although such systems are easier to use than the command-line shell interfaces that preceded them, they generally have not provided a greater degree of abstraction from the underlying physical storage of data than was available in earlier systems.

The real-world familiarity of the file/folder model of storage contributed to its acceptance and popularity among computer users, but such user interfaces were also successful because users typically stored a relatively small number of data files on their machines. The ease with which computer systems can now be used, coupled with the availability of massive amounts of inexpensive disk storage, have to some degree made the standard data storage interface a victim of its own success. Computers are now being used to store large quantities of personal data in a variety of different formats for use with many different applications. It is not uncommon for a user to have hundreds or thousands of text documents, photographs, audio files, and other data records stored across multiple hard disks, shared networks and other storage media. Given such a development, drawbacks to the conventional folder tree storage model have become evident to computer users.

For the present-day user, the conventional storage model is undesirably and inflexibly one-dimensional. Items of data exist in one location and relate to other files in one way, by their relative position within the hierarchical folder tree, which ignores the many logical relationships files may have to one another. In previous versions of Microsoft® Windows®, files are associated with a limited number of properties over which the user has limited control, and those properties are accessible through a control that is difficult to locate and use. In other systems file metadata may be limited to the file name and the user's informal knowledge of the file's type. Such limitations have made it difficult for users to organize their data in new ways based on the content and use of the data. As a result, the growth in the amount of data stored by users has made searching for data less efficient and more cumbersome.

Particular applications have offered domain-specific solutions to the problem of user data management. Two examples involve applications for storing and organizing digital photograph files. The Digital Image Library in Microsoft® Digital Image Suite 9.0 includes a "Keyword Painter" control that enables the user to easily organize and subsequently locate images stored in disparate locations throughout the file system. The user clicks on identifying keywords of the user's own choosing and then clicks on thumbnail images of pictures to which the selected keywords are to be assigned. The user can now filter the view of the library of pictures by particular keywords. Adobe Photoshop Album 2.0 permits the user to associate content-descriptive tags with pictures by drag-drop actions on thumbnail images. The user can then quickly search the collection of pictures by subject matter using one or more tags.

Another example is the Grand Central e-mail interface, a project of Microsoft Research. Hierarchical properties are used to categorize e-mail messages. An arbitrary number of categories can be assigned by way of the user interface. The categories facilitate searching for messages and the organization of messages into conversational threads.

Disclosed features of the Microsoft® Windows® Code-Named "Longhorn" platform point to a more comprehensive solution. A storage subsystem, WinFS, relies on an extensible scheme of metadata properties to enable the user to search for, organize and share data. The basic unit of data container is the item, which is associated with multiple properties set to specific values. Items are organized by properties most relevant to the user at a particular time. Powerful querying capabilities over the store of items are provided. Users can thus find data more quickly and can organize and operate upon data more efficiently.

Prior to the present invention, however, there has been no general mechanism for metadata assignment and metadata-based navigation comparable in ease and generality of use to such conventional storage system interfaces as the file system Explorer tree of previous versions of Microsoft® Windows®, which permit the user to navigate to a folder and to modify its contents in intuitive ways such as by dragging and dropping with the mouse.

SUMMARY

The following represents a simplified summary of some embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in simplified form as a prelude to the more detailed description that is presented below.

Features may be practiced in the context of a computer system having a graphical user interface, or another kind of user interface, and a data storage subsystem in which data items are organized and queried by way of metadata properties. In accordance with one embodiment, a computer-implemented method of assigning values to properties is provided. The method includes displaying a property tree having nodes that expose properties of a set of data items, where the property tree utilizes a carousel control for displaying subnodes parented by a node in the tree.

In some aspects of the aforementioned embodiments, the property tree also provides nodes that represent folders within a hierarchical file system, in addition to nodes that represent metadata properties. In other aspects of these embodiments, the property tree has nodes that represent properties with inherent hierarchy, and nodes that represent user-defined hierarchical properties.

According to an aspect of the invention, software instructions control a carousel control within a menu displayed on a computer display device. The carousel control displays a list of elements in a display area that can display a certain number of elements at a time. An input handler associated with the carousel control handles user input for scrolling the list elements displayed in the display area, based on each element's order within the list, such that a user can traverse the list. For example, the carousel control may store the list elements in a circular list, ordered by some criteria, and a user can circle through the list as desired within the display area.

The invention may be implemented by way of software, hardware, or a combination thereof. The invention may be implemented, for example, within an operating system shell or within a running application program. It is contemplated that the invention may be embodied in one or more computer-readable media.

BRIEF DESCRIPTION OF THE DRAWINGS

Features of the invention will become apparent from the following detailed description when taken in conjunction with the drawings, in which:

FIGS. 2, 3, 4, 5, 6, 7, 8, 9, 10, 11, 12, 13, 14, 15, 16, 17, 18 and 19 are screenshots of a user interface for viewing and organizing stored music data, within which an embodiment of the present invention is incorporated.

FIGS. 20, 21, and 22 illustrate carousel controls according to various features described herein.

DETAILED DESCRIPTION

Figure 1:
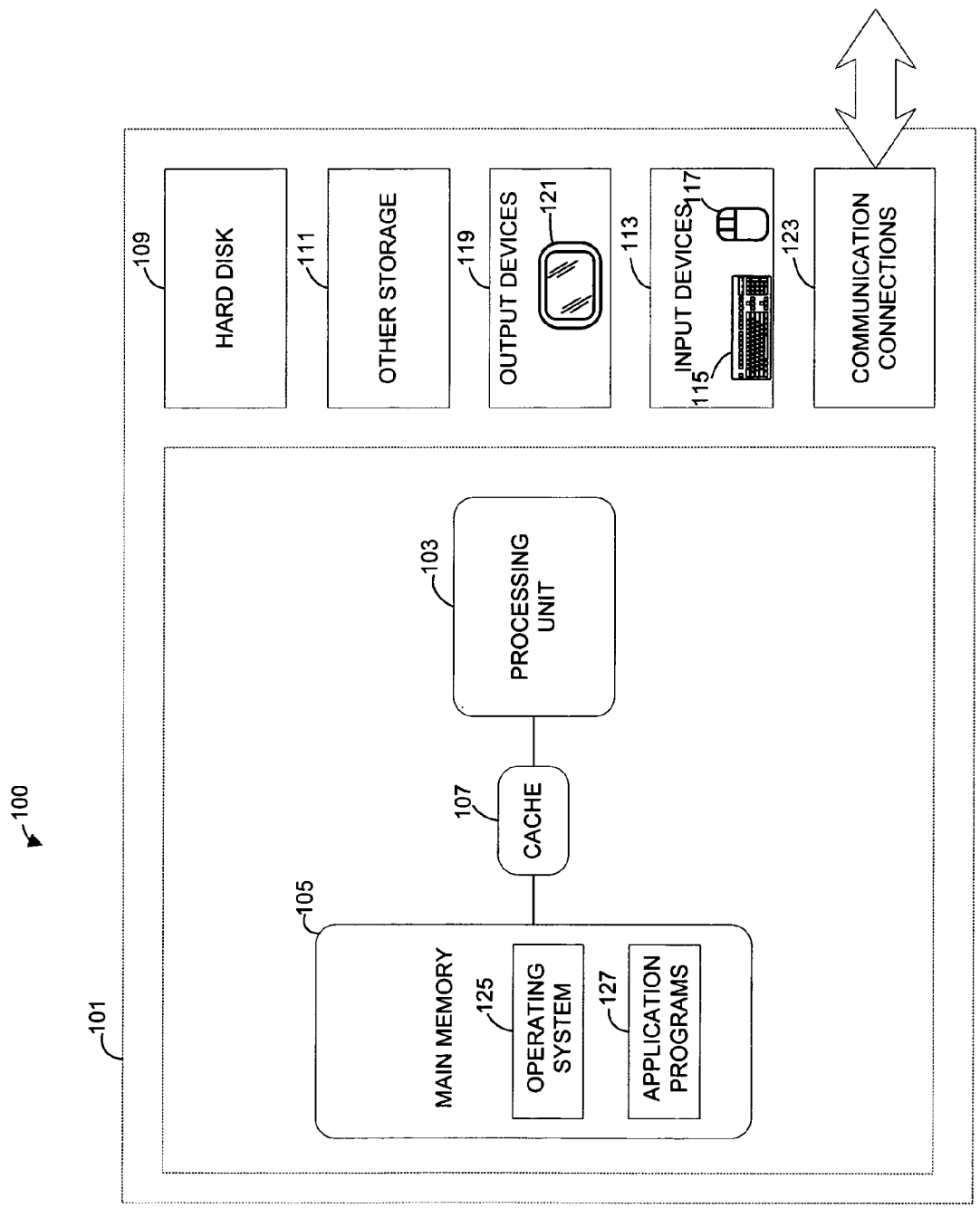
FIG. 1 is a schematic diagram showing an exemplary computer operating environment within which the present invention may be incorporated.

The present invention includes a tree-shaped set of user interface controls that exposes properties of data items, which will henceforth be referred to as the "ProperTree." The ProperTree provides two principal functions. First, the ProperTree enables the user to navigate across the virtual namespace of the user's data. Navigation is discussed further below. Second, the ProperTree permits the user to quickly and easily assign values to data item properties by adding or removing metadata with respect to property nodes exposed by the ProperTree. The user can add metadata to, and remove metadata from, many nodes at the same time. Because the ProperTree mimics the traditional folder tree control in certain respects, it enables users familiar with the conventional approach to storing, organizing and retrieving their data to work comfortably in a system with a radically different approach to storage that relies upon an extensible scheme of metadata properties and querying.

In one embodiment, the ProperTree control is displayed by default in a window within a pane to the left of a pane displaying a list view of items. When the user selects an item, the user can click on a property node exposed by the ProperTree to expand the node in place; the node can be collapsed if it is already expanded. A small widget, such as one displaying '+' or '−', may be used to indicate whether a node is collapsed or expanded. The expansion of a node shows the property values set for the currently selected item, as well as additional values that can be applied. In an embodiment, a most-frequently-used subset of values across a set of items is shown; the user can expand the list of values for the expanded property fully by, for example, clicking on a button. Having expanded a property node in the ProperTree, the user can change the property values; the changes are immediately applied to the item or items that have been selected by the user. The system may assign initial values to properties based on most-frequently used values.

Properties are displayed in the ProperTree in a manner that is appropriate to their type. Certain properties have only one value with respect to an item. A photograph, for example, might be either "Black/White" or "Color," with users being permitted to change this property. The user interface for changing the value may, in such a case, comprise a clickable radio button adjacent to each possible value. Other properties may be capable of having multiple values with respect to an item. For example, a document may have multiple authors. In this case the user interface may comprise a checkbox adjacent to each possible value, with the user being permitted to check one or more boxes as desired. Richer properties are also supported appropriately. For example, a rich calendar control is shown for dates; for ratings, a five-star control may be shown.

Properties that cannot be changed by the user, such as the date on which a document is written, do not have value selection controls in the tree, and the nodes for such properties can only be used for navigation. The system is extensible with respect to adding new controls appropriate to particular data types.

For any given property or property value in the ProperTree, the user can navigate to a view of storage that is pivoted to that property or value. Thus, navigation does not simply involve taking the user to a single location, unlike navigation using a conventional folder tree. Rather, navigation by way of the ProperTree causes all relevant data to be rearranged into a new structure through which the user can browse. For example, the user can use the ProperTree to query storage for all documents having a particular "Author" value. The list view then changes to show documents meeting that criterion. Alternatively, the user can use the ProperTree to display all document authors. This causes a stacked view of authors within which the user can then browse.

Turning now to the drawings, FIGS. 2 through 19 are screenshots of an exemplary user interface 201 for viewing and organizing stored music data, incorporated an embodiment of the present invention. On the right is a list view 205, and on the left is a ProperTree property tree 203. In an embodiment, similar interfaces are provided for documents, messages, video files, and contacts, with the ProperTree in each case being specifically adapted for the kind of data item that is presented. Such content-oriented interfaces may be provided with an operating system product as a component of the shell. Additionally, in an embodiment of the invention, the ProperTree is a control made available through the Common File Dialog in Microsoft® Windows® for application developers to reuse in their own applications. As noted above, the ProperTree 203 is displayed on the left side of the window 201 by default.

The ProperTree 203 includes a header 207, which in the depicted case is titled "Music Links". Below the header 207 are the nodes of the ProperTree 203. The nodes labeled Rating 217, Artist 221, and Genre 223, represent single properties. Certain other nodes exposed by the tree 203, All Songs 209, Online Store 211, and Recently Played 215, are constructs that represent a query that searches for particular items in the list view 205 that satisfy conditions of the query. The nodes iPod 213 and Playlists 219, which represent static lists, are similar. If the user selects All Songs 209, for example, all the songs in the list view 205 are displayed. If the user selects Recently Played 215, however, only songs that have recently been played are shown.

Turning to FIG. 3, the effect of an initial user interaction with the ProperTree 203 is shown. "Expand" widgets 327, 329, 331, 333, 335 are displayed next to the expandable property nodes 213, 217, 219, 221, 223, respectively, when the user hovers in the area of the ProperTree with the mouse, as indicated by the arrow cursor 325. The property nodes 213, 217, 219, 221, 223 can be expanded by the user by clicking on the displayed '+' in the widgets 327, 329, 331, 333, 335.

Turning to FIG. 4, there is shown the state of the ProperTree 203 after the user hovers with the mouse over the text label of one of the property nodes, in this case Artists 221, as indicated by the hand-shaped cursor 437. If the user double-clicks on the text label of the property node, the list view 205 will be updated so that it is organized by the particular property that is selected, and the node will expand. In FIG. 5, there is shown the state of the ProperTree 203 when the user hovers with the mouse over the '+' of the expand widget 333 associated with the Artists node 221, as indicated by the mouse arrow cursor 539.

Turning to FIG. 6, there is shown the state of the ProperTree 203 after the Artists node 221 is expanded. The "Artists" text label is rendered in boldface, and the expand widget is replaced by a "collapse" widget 641. A list of five Artists values 643, 645, 647, 649, 651 is displayed, representing the most frequently used and most recently used values, below which is an overflow arrow button 653.

Figure 7:

FIG. 7 shows the effect of the user clicking on the overflow arrow 653, as indicated by the mouse arrow cursor 755. A pop-up menu 757 is displayed, showing all the values for the Artists property as a flat list. Alternatively, as shown in FIG. 8, the complete list of values can be displayed in a pop-up menu 859 as a list of several subnodes 861, 863, 865, 867, 869, each subnode representing a range within the full list that can be expanded further by the user by clicking on one of the rightward-pointing arrow buttons 871, 873, 875, 877, 879. An alternative rendering of the range pop-up menu 881 is also shown.

Returning briefly to FIG. 6, it may be noted that a property value name 649 that is too long to display in full is truncated with an ellipsis or similar symbol. In FIG. 9, the effect of hovering over such a truncated value is shown, as indicated by the mouse hand-shaped cursor 983. A pop-up element 985 displays the full name of the value.

Turning to FIG. 10, there is shown the effect of selecting an item in the list view 205. Checkboxes 1087, 1089, 1091, 1093, 1095 are immediately displayed next to each value in the expanded property node 221. The checkboxes serve as controls by means of which metadata can be assigned to the selected item. In this case, the user has selected the song item "Encounter" 1097. The checkbox 1089 is checked, indicating that the existing Artist value for that item is "50 Cent." The user can check a different box to change the value by assigning a different artist name to the song item. Similarly, checkboxes can be used in a list view of photographs to assign keywords to a selected photograph item. FIG. 11 shows the effect of the user clicking on the overflow arrow button 653 when an item in the list view 205 has been selected, as indicated by the mouse arrow cursor 1101. The pop-up menu 1103 is displayed, each value in the complete list now having a checkbox in front of it.

In general, a property node in the ProperTree 203 may have a context menu that is specific to that node. An example is shown in FIG. 12, where the context menu 1205 for the node Artists 221 is displayed. The top element in the menu 1205 is "Show All Music By Artist" 1207. The effect of selecting this task is identical to the navigation effect of clicking on the "Artists" label, as described above. "Add new Artist" 1209 provides an entry point for the user to add additional values to the list of values for this property node. "Rename" 1211 can be used to rename the property. In this case "Rename" is grayed out because Artists is a property that end users cannot rename. A user can devise new properties which can be made renameable. The "Move Up" 1213 and "Move Down" 1215 menu elements can be used to organize the order of property nodes in the ProperTree 203.

FIG. 13 shows the state of the ProperTree 203 after the user has selected "Add new Artist" 1209 in the context menu 1205 shown in FIG. 12. A type-in box 1317 is displayed, permitting the user to enter a new value for the Artists property. Once a new Artists value is entered, it can be assigned to a selected song item.

FIG. 14 illustrates the fact that the ProperTree 203 is not restricted to containing assignable property nodes, but may contain several kinds of navigable sets, pages or collections. Here the Playlists node 219 has been expanded. Playlists in the music data item context are one example of user-defined lists that function as data item containers, similar to traditional file system folders. As with traditional folders, the Playlists 219 may have an arbitrary number of nested components in a hierarchical structure, unlike property nodes that comprise only values. Here a most-frequently-used subset 1419, 1421, 1423 of the sublists of Playlists is displayed, below which is an overflow arrow button 1425. FIG. 15 displays the state of the ProperTree 203 after the user clicks the overflow button 1425 of FIG. 14. The full list hierarchy of Playlists 219 is displayed, comprising sublists 1421, 1527, 1529, 1531, 1533, 1423.

Turning to FIG. 16, there is shown the state of the ProperTree 203 after the user selects the label 1637 of the "Recently played" node 215, as indicated by the mouse arrow cursor 1635. As noted above, this node is not a single property, but represents a query. The user can pivot the list view by selecting the glyph 1639 to the left of the node label 1637, as explained above. As shown in FIG. 16, selecting the node label 1637 displays a context menu 1641. Selecting the top element 1643 of the context menu 1641, "Show 'Recently Played'", has the same navigation effect as selecting the glyph 1639. Below this are two specific node tasks 1645, 1647 (not further specified here). The remainder of the context menu 1641 is similar to the context menu 1205 for the property node Artists 221 in FIG. 12. The user can select Delete 1649 to delete an item, Rename 1651 to rename it, and Move Up 1653 and Move Down 1655 to reorder it in the ProperTree 203.

Turning to FIG. 17, there is shown the state of the ProperTree 203 after the user clicks on the Music Links header 207, as indicated by the mouse arrow cursor 1759. A command menu 176 is displayed, permitting the user to perform certain tasks applicable to the entire tree control 203. By selecting the task "Add Current Page to Music Links" 1763, the user can define new nodes to add to the tree 203. By selecting "Sort Music Links by" 1765, the user can sort the nodes in a desired order. The user can hide the entire tree 203 from view by selecting "Hide Pane" 1767. By selecting the entry point 1769 at the bottom of the menu, "Add/Remove MusicLinks", the user causes a dialog to be brought up, allowing the user to select among different properties to add or remove properties to or from the ProperTree 203.

Figure 19:
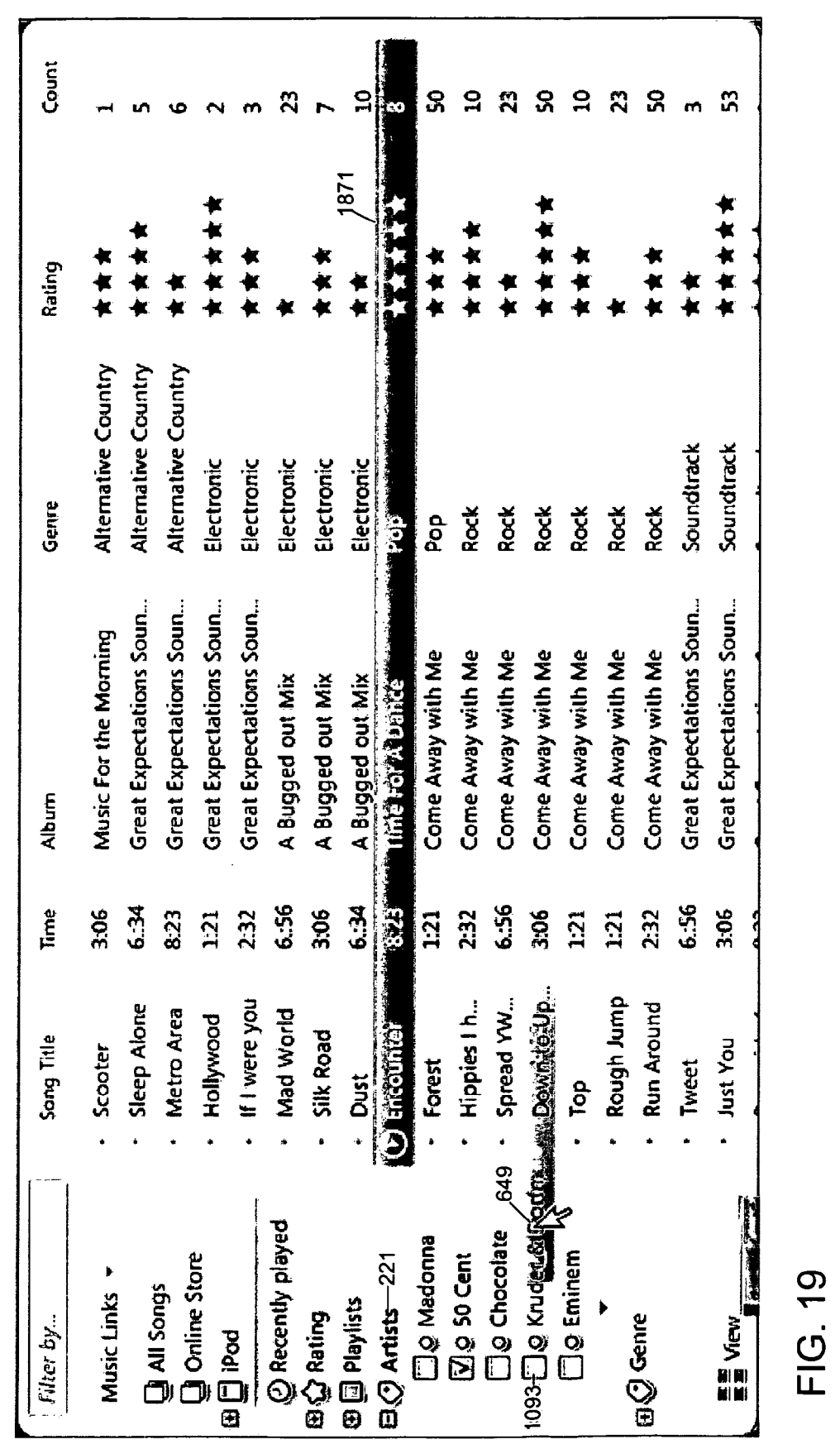

Similarly to the conventional folder tree control, the ProperTree 203 supports drag-and-drop semantics, but the behavior is different. An item in the list view 205 can be dragged and dropped onto a node in the ProperTree 203, but the item does not disappear from the list view; the behavior is more like tagging information to a file. A drag/drop action is shown in FIG. 18. The user clicks on an item in the list view, here the item 1871 corresponding to the song "Encounter," and drags it to the Artists node 221 in the ProperTree 203, as indicated by the mouse arrow cursor 1873 and the blurred selected item image 1875. In this case, Artists 221 is not itself an assignable property. Turning to FIG. 19, if the user hovers over the Artists node 221 for a sufficient length of time, the node 221 expands, permitting the user to drop the dragged item 1871 onto the name of a displayed artist. In this case the user is dropping the item 1871 onto the Artists value "Kruder & Dorfmeister" 649, and the checkbox 1093 associated with that value is highlighted. This is thus another mechanism by which a user can assign metadata to items.

In one embodiment of the invention, the ProperTree is integrated with a conventional folder tree control. In this embodiment, the tree has nodes that represent properties and expand to reveal values, as well as nodes that represent folders located in the hierarchical file system. In this embodiment, the advantages of both the hierarchical model and the metadata model of storage are present. The tree may additionally include nodes representing other constructs, such as a link to a web page.

In an embodiment, the ProperTree supports "hierarchical properties," properties that inherently have hierarchy. For example, a date property may be represented in the tree as the hierarchy:

Year
  Month
    Day

In addition, in an embodiment, the ProperTree supports free-form hierarchical properties that are set by the user.

For example:
Animal
  Dog
    Poodle
  Cat
Mineral
  Gold
Plant
  Palm Tree

With reference to FIG. 20, the property tree may use a carousel control 2001 to display subnodes under any parent node within the property tree. Carousel control 2001 may be used, e.g., to display subnodes when a limited amount of vertical display screen real estate (space) is available, or to limit a single node or nodes from using all the available vertical display screen space for the display of that node's respective subnodes. The carousel control is useful, e.g., to scroll large sets of subnodes in a limited amount of space in which the entire set of subnodes cannot all be displayed simultaneously.

Carousel control 2001 includes a circular list 2003 of all elements 2011a and 2011b within the carousel control 2001, and a corresponding display area 2005. The circular list 2003 may be organized according to some predefined criteria or metadata, for example, alphabetical, chronological, etc. Display area 2005 displays one or more elements of the carousel control 2001. In this example, the carousel control is used to display subnodes under an "Artist" node 2007 of a property tree 2009. The elements 2011a and 2011b of carousel control 2001 include the subnodes of the Artist node 2007, namely, Abba, Adam Ant, Allman Bros., Beach Boys, Blink 182, Kelly Clarkson, Missy Elliott, Foo Fighters, Jet, The Killers, Modest Mouse, REM, Gwen Stefani, U2, Weezer, and Zornik. The nodes Artist, Song, and Album are not elements of carousel control 2001. In this example, display area 2005 displays four elements 2011a at a time, although other numbers of elements may alternatively be displayed as desired or as dictated by screen space. In FIG. 20, the nodes Artist, Jet, The Killers, Modest Mouse, REM, Song, and Album are visible to the user, while the remaining elements 2011b of carousel control 2001 are not presently displayed.

While the carousel control has input focus, a user can scroll the elements in the carousel control to circularly shift the elements visible in display area 2005. For example, pressing the up arrow when the carousel control is positioned as shown in FIG. 20 may result in rotating the carousel control up, such that the elements The Killers, Modest Mouse, REM, and Gwen Stefani are displayed in the display area 2005. Similarly, pressing the down arrow when the carousel control is positioned as shown in FIG. 20 may result in rotating the carousel control down, such that the elements Foo Fighters, Jet, The Killers, and Modest Mouse are displayed in the display area 2005. Those of skill in the art will appreciate that other navigation/scroll techniques and inputs may be used to control the rotation of the carousel control 2001.

When the user has scrolled to the beginning or end of the elements as presently arranged (e.g., alphabetical, chronological, etc.), upon further scrolling in the same direction the carousel control continues traversing the circular list. Thus, when scrolling in alphabetical order, upon reaching the last item in the carousel control (here, Zornik), the carousel control displays the first item in the list (here, Abba) upon further scrolling by the user in the same direction. The reverse is also true, such that when scrolling in reverse alphabetical order, upon reaching the first item in the carousel control (here, Abba), the carousel control displays the last item in the list (here, Zornik) upon further scrolling by the user in the same direction.

A user may also "jump" to a specific item in the list by typing one or more characters on an attached keyboard or other data entry device. For example, by typing the letter 'U,' the carousel control may automatically rotate or shift the carousel control such that the first item matching the input is displayed at the top of the display area 2005. The results of such input are shown in FIG. 21

Similarly, if a user inputs the letter 'B,' the carousel control may jump to display the element Beach Boys at the top of the display area 2005. However, if the user inputs B-L (case sensitivity is optional, and not necessary) in quick succession (within some predetermined amount of time, and/or without a delay exceeding some predetermined amount of time between the inputs), the carousel control may jump to display the element Blink 182 at the top of the display area 2005. The carousel control may include an input handler routine for scrolling and jumping to particular elements based on user input.

While the example of FIGS. 20 and 21 illustrates an alphabetical carousel control, any organization of elements in the circular list corresponding to a carousel control may be used, including for example, chronological, numerical, color, genre, category, a metadata value, user specified order, etc. The presently displayed elements 2011a of a carousel control 2001 may provide the same behavior as other nodes in the property tree 2009. That is, nodes may be dragged and dropped, expanded, collapsed, etc., while displayed in display area 2005. Those of skill in the art will appreciate that various modifications may be made to the carousel control, e.g., the carousel control may utilize a list instead of a circular list, such that a user cannot scroll continuously through the ends of the list. That is, when a user reaches the end of the list, the scrolling stops, and does not begin anew at the beginning of the list. Likewise, when a user scrolls to the beginning of the list, scrolling does not continue from the end.

Those of skill in the art will appreciate that various modifications may be made to the carousel control to provide additional functionality to a user. For example, the carousel control may be used with hierarchical properties, such that one carousel control becomes nested within another. In such a nested embodiment, the nested carousel control reflects (i.e., is based on) the selected parent element 2011*a* from the parent carousel control, and keyboard shortcuts are usable within whichever carousel control presently has input focus.

Figure 22:
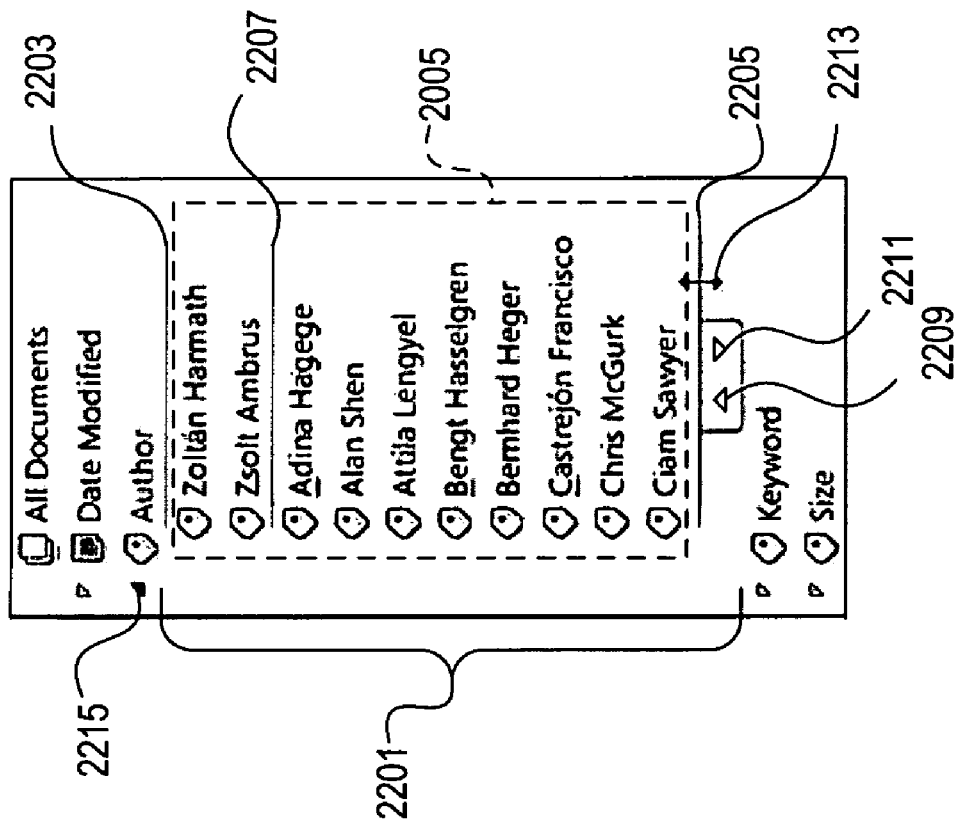

Carousel controls may be provided with any number of display appearances. For example, FIG. 22 illustrates a carousel control 2201 according to another illustrative appearance. Carousel control 2201 includes top marker 2203 indicating the upper boundary of the display area 2005, bottom marker 2205 indicating the lower boundary of the display area 2005, revolution marker 2207 indicating the virtual boundary between the end and the head of the circular list as the carousel control revolves through the entire list, and scroll controls 2209, 2211 for scrolling up and down, respectively. A carousel control, e.g., carousel control 2201, may expose navigation and control capabilities to the user. A user may be able to resize the carousel control 2201 by hovering a cursor 2213 over a boundary line, e.g., lower boundary 2205, and selecting and dragging the lower boundary line 2205 such that the display area 2005 is a desired height. In addition, a user may automatically expand the display area to a maximum height, e.g., by double clicking the down scroll control 2211. Similarly, double clicking the up scroll control 2209 may result in the collapsing of the display area, similar to the user selection of an expand/collapse widget 2215.

FIG. 1 is a highly simplified schematic diagram showing an example of a suitable operating environment 100 in which any or all of the features described herein may be implemented. The features of such environments are well-known to those having skill in the art and need not be described at length here. The operating environment 100 is only one example of a suitable operating environment and is not intended to suggest any limitation as to the scope of use or functionality of the invention. Suitable computing environments for use with the invention include any computing device or computing system that supports interaction between user and machine.

With reference to FIG. 1, an exemplary system for implementing the invention includes a computing device, such as device 101. Device 101 typically includes at least one processing unit 103 and main memory unit 105, and at least one level of cache memory 107 connected to or situated within the processing unit 103 and serving as a buffer for the main memory 105. Device 101 has additional storage, including at least one magnetic hard disk 109 that serves as nonvolatile secondary storage and which is additionally used along with the main memory 105 in providing virtual memory. Device 101 may also have other storage 111, such as optical disks, removable magnetic disks, magnetic tape, and other removable and nonremovable computer-readable media capable of nonvolatile storage of program modules and data and accessible by device 101. Any such storage media may be part of device 101. To facilitate user-machine interaction, device 101 has input devices 113, such as a keyboard 115 and a mouse 117 or other pointing device, and output devices 119, including a monitor or other display device 121. Device 101 also typically includes one or more communication connections 123 that allow the device to communicate data with other devices.

Programs, comprising sets of instructions and associated data for the device 101, are stored in the memory 105, from which they can be retrieved and executed by the processing unit 103. Among the programs and program modules stored in the memory 105 are those that comprise or are associated with an operating system 125 as well as application programs 127. The device 101 has one or more systems of logical data storage, such as a file system or alternative systems using database-related techniques, associated with the operating system 125. Such systems of logical data storage serve as interfaces that map logically-organized data to data physically located on secondary storage media, such as data stored in clusters or sectors on the hard disk 109.

Computing device 101 includes forms of computer-readable media. Computer-readable media include any available media that can be accessed by the computing device 101. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

All references cited herein are hereby incorporated by reference to the same extent as if each reference were individually and specifically indicated to be incorporated by reference and were set forth in its entirety herein.

The use of the terms "a," "an" and "the" and similar referents in the context of describing the invention, especially in the context of the following claims, is to be construed to cover both the singular and the plural, unless otherwise indicated herein or clearly contradicted by context. The terms "comprising," "having," "including," and "containing" are to be construed as open-ended terms (meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples or exemplary language herein (e.g., "such as") is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations on those preferred embodiments may become apparent to those having ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method of assigning values to properties in a computer system having a graphical user interface (GUI) and a data storage subsystem in which data items are organized and queried using metadata properties, the method comprising:

displaying a property tree, the property tree having a plurality of nodes exposing properties of a set of the data items revealed in a list view, one or more nodes of the plurality of nodes having a widget associated therewith for switching between an expanded state and a collapsed state;

receiving an indication of a selection of the widget associated with the one of the plurality of nodes to switch to the expanded state;

displaying an initial list including a predefined number of a set of subnodes parented by the selected one of the plurality of nodes, wherein the displayed set of subnodes in the initial list represents most-frequently-used values or most-recently-used values;

upon receiving an indication to further expand the one of the plurality of nodes, invoking a carousel control that provides a circular list of the set of subnodes parented by one of the plurality of nodes, wherein invoking the carousel control comprises:
  (a) visibly displaying, to a user, a number of the set of subnodes within a display area, wherein the number of the set of subnodes being visibly displayed in the display area is a function of screen space of the GUI;
  (b) not presently displaying remaining nodes of the set of subnodes that are outside the display area, and;
  (c) providing one or more selectable boundaries of the display area that allow the user to resize the display area and adjust the number of the set of subnodes visibly displayed therein;

receiving a selection of one or more items of the set of data items revealed within the list view;

displaying a control proximate to one or more subnodes of the set of subnodes that, upon selection by the user, assigns a value to at least one property of the properties of the selected one of the set of data items;

receiving a user input that selects the control proximate to the one or more subnodes of the set of displayed subnodes;

ascertaining that the one or more subnodes of the set of selected subnodes is capable of assigning the value to the at least one property of the one of the set of data items based on whether the at least one property of the properties of the one of the set of data items is changeable by the user; and in response to the user input directed at the one or more subnodes of the set of selected subnodes ascertained to be capable of assigning the value to the at least one property, modifying the at least one property of the selected one or more data items of the set of data items, wherein modifying comprises adding metadata to, or removing metadata from, the selected one or more data items of the set of data items based on the value of the at least one property represented by the one or more subnodes of the set of selected subnodes.

2. The computer-implemented method of claim 1, further comprising sorting the circular list according to predefined criteria.

3. The computer-implemented method of claim 2, wherein the predefined criteria comprise alphabetical order.

4. The computer-implemented method of claim 2, wherein the predefined criteria comprise numerical order.

5. The computer-implemented method of claim 1, further comprising exposing a second carousel control corresponding to subnodes of a first one of the plurality of nodes.

6. The computer-implemented method of claim 1, wherein the property tree displays the plurality of nodes exposing properties of the set of data items in a parent carousel control, while the set of subnodes parented by the selected one of the plurality of nodes is displayed in another carousel control nested within the parent carousel control.

7. The computer-implemented method of claim 1, further comprising, upon receiving a selection of a header of the property tree, displaying a command menu that shows selectable tasks to the user, wherein the selectable tasks comprise:
  a first task that, upon selection, allows the user to define a new node within the plurality of nodes of the property tree, wherein the new node allows the user to modify a new property of the one or more data items of the set of data items; and
  a second task that, upon selection, allows the user to sort the plurality of nodes of the property tree to a desired order.

8. A computer storage medium having computer executable instructions embodied thereon executable by a computer processor to display a menu on a computer display device, said menu comprising:
  a list view that reveals a set of data items;
  a property tree comprising a plurality of nodes exposing properties of the set of data items revealed in the list view, wherein, upon selection, at least one of the plurality of nodes is capable of rearranging a current organization of the set of data items into a new organization that satisfies a query associated with the selected at least one of the plurality of nodes;
  a list of elements displayed upon detecting an indication to expand one of the plurality of nodes in the property tree, wherein the elements comprise a set of subnodes parented by the one of the plurality of nodes;
  a control displayed proximate to one or more subnodes of the set of subnodes that, upon selection, is capable of assigning a value to at least one property of a data item of the set of data items within a data storage subsystem, wherein assigning the value to the at least one property of the data item comprises:
    (a) receiving, from a user, an input that selects the control displayed proximate to the one or more subnodes of the set of subnodes;
    (b) ascertaining that the one or more subnodes of the set of subnodes is capable of assigning the value to the at least one property of the data item of the set of data items as a function of whether the at least one property of the properties of the data item is changeable by the user; and
    (c) upon ascertaining that the one or more subnodes of the set of subnodes ascertained is capable of assigning the value to the at least one property, modifying the at least one property of the data item, wherein modifying comprises adding metadata to, or removing metadata from the data item based on the value of the at least one property represented by the one or more subnodes of the set of subnodes proximate to the control;
  the carousel control that visibly displays, to the user, a number of the set of subnodes within a display area and that is invoked upon ascertaining that an entirety of the set of subnodes parented by the selected one of the plurality of nodes cannot be displayed simultaneously within the display area available to the carousel control, wherein the number of the set of subnodes being displayed is a function of screen space of the display area;
  the display area in the number of the set of subnodes are displayed concurrently, wherein the carousel control provides a circular list of the set of subnodes, such that at least one of the set of subnodes is visible to the user at the display area while remaining nodes of the set of subnodes are not visible.

9. The computer storage medium of claim 8, wherein the list of elements comprises elements ordered according to predetermined criteria.

10. The computer storage medium of claim 9, wherein the predetermined criteria comprise alphabetical order.

11. The computer storage medium of claim 9, wherein the predetermined criteria comprise chronological order.

12. The computer storage medium of claim 8, wherein the menu further comprises an input handler for scrolling a predetermined number of the list of elements displayed in the display area, wherein the input handler causes the carousel control to display a particular element matching a particular user input, the particular element being displayed in a predetermined position within the display area.

13. The computer storage medium of claim 12, wherein the input handler further receives a user input for defining a size of the display area.

14. The computer storage medium of claim 13, wherein, upon receiving the user input, the input handler causes the display area to resize to a maximum size.

15. The computer storage medium of claim 12, wherein the input handler exposes an up control for rotating the carousel control upwards, thereby shifting the list elements displayed in the display area.

16. The computer storage medium of claim 12, wherein the input handler exposes a down control for rotating the carousel control downwards, thereby shifting the list elements displayed in the display area.

17. The computer storage medium of claim 12, wherein the input handler further causes the carousel control to traverse the list of elements and display the particular element at the predetermined position within the display area when the particular element matches the particular user input, wherein the particular user input includes one or more characters typed on a data-entry device in quick succession.

18. The computer storage medium of claim 8, wherein the list of elements comprises musical artists.

19. One or more computer storage media having instructions embodied thereon executable by a computer processor to perform a method for displaying a property tree having a plurality of nodes that expose properties of a set of data items, the method comprising:

displaying the set of data items in a list view; displaying the plurality of nodes in the property tree, wherein the property tree and the list view are concurrently displayed on a graphical user interface rendered by a display device, wherein displaying the plurality of nodes comprises:

(a) displaying a first node that, upon receiving a first selection thereto, organizes the set of data items in the list view according to a query associated with the first node, wherein, upon receiving a second selection thereto, the first node expands to reveal a first set of subnodes parented by the first node, and wherein, upon receiving a selection at one or more subnodes of the first set of subnodes, a value is assigned to a first property of at least one of the set of data items; and (b) displaying a second node that, upon receiving a third selection thereto, reveals a predefined static list composed of one or more data items of the set of data items, wherein, upon receiving a fourth selection thereto, the second node expands to reveal a second set of subnodes parented by the second node; and assigning a value to a second property of the at least one of the set of data items by selecting and dragging the at least one of the set of data items from the list view onto one or more subnodes of the second set of subnodes within the property tree.

* * * * *